(12) United States Patent
Fujiyama

(10) Patent No.: US 7,434,668 B2
(45) Date of Patent: Oct. 14, 2008

(54) BRAKE CABLE CONNECTING APPARATUS

(75) Inventor: Masami Fujiyama, Yokkaichi (JP)

(73) Assignee: Nisshinbo Industries, Inc., Tokyo (JP)

( * ) Notice: Subject to any disclaimer, the term of this patent is extended or adjusted under 35 U.S.C. 154(b) by 235 days.

(21) Appl. No.: 11/245,328

(22) Filed: Oct. 6, 2005

(65) Prior Publication Data

US 2006/0070825 A1    Apr. 6, 2006

(30) Foreign Application Priority Data

Oct. 6, 2004    (JP) .............................. 2004-294059

(51) Int. Cl.
*B60T 1/00* (2006.01)

(52) U.S. Cl. ................... 188/2 D; 188/106 A; 188/325; 74/502.6

(58) Field of Classification Search ................. 188/2 D, 188/106 A, 106 F, 325, 331, 78, 74, 79.57, 188/106 P; 74/502.6, 500.5, 502.4
See application file for complete search history.

(56) References Cited

U.S. PATENT DOCUMENTS 5,720,367 A * 2/1998 Evans ....................... 188/79.64
6,318,207 B1 * 11/2001 Asai et al. ................... 74/502.6
6,490,946 B2 * 12/2002 Ikeda ......................... 74/500.5
6,732,840 B2 * 5/2004 Ikeda et al. ................. 188/2 D
6,817,450 B2 * 11/2004 Tatsumi et al. .............. 188/2 D

FOREIGN PATENT DOCUMENTS

JP    2001-349359    12/2001

* cited by examiner

*Primary Examiner*—Robert A. Siconolfi
*Assistant Examiner*—Mariano Sy
(74) *Attorney, Agent, or Firm*—Apex Juris, pllc; Tracy M Heims

(57) ABSTRACT

A brake cable connecting apparatus that prevents a connecting pin from falling out, and whereby it is unnecessary to adjust the insertion depth of the connecting pin. The brake cable connecting apparatus comprises a regulating projection in the strut to prevent over-insertion of a connecting pin. A cable connecting groove is formed in the plate-like brake lever and is supported on the strut by the two facing surface walls. Two resilient members are deformed to allow the connecting pin to move into a cable connecting groove if an inner cable is pulled to insert the connecting pin laterally bridged between two facing plates of the clevis of the brake cable. Further, a cable disengagement restriction portion prevents passage of the connecting pin if the connecting pin may potentially fall out from the cable connecting groove.

18 Claims, 24 Drawing Sheets

BRAKE CABLE CONNECTING APPARATUS

BACKGROUND OF THE INVENTION

1. Field of the Invention

The invention relates to a mechanical shoe expander for a drum brake device and more particularly to a brake cable connecting apparatus for connecting a clevis of a brake cable to a brake lever of a brake actuating mechanism mainly comprised of a strut and the brake lever via a connecting pin.

2. Description of the Related Art

A known brake cable connecting apparatus is such that a brake cable, mainly comprised of an inner cable and a clevis, is connected to a brake actuating mechanism comprised of a plate-like brake lever, a strut, a pivot pin and a washer, via a connecting pin. The configuration where the connecting pin is engaged with a cable connecting hole formed in the brake lever and engagement holes formed in the clevis is widely used.

The suggested configuration where the cable connecting hole of the brake lever is replaced with a cable connecting groove will be explained next as an example of a conventional type with reference to FIG. 24. A brake lever 71 has a cable connecting groove 71d in a free end 71c, and a spring member 90 urges the cable connecting groove 71d to cover thereof. When a clevis 82 of a brake cable 80 is connected to the brake lever 71, engagement holes 82b (only one side shown in FIG. 24) of the clevis 82 are placed above the spring member 90, a connecting pin 84 is engaged with the engagement hole 82b, 82b as shown with the phantom line (two-dot chain line), and the spring member 90 is deformed as pulling an inner cable 81, allowing the connecting pin 84 to pass to the cable connecting groove 71d shown as the entity, thereby completing the connection of the brake cable 80 to the brake lever 71. As the spring member 90 covers the cable connecting groove 71d of the brake lever 71 after that, the brake cable 80 is not disengaged from the brake lever 71.

However, when the connecting pin 84 is engaged with the clevis 82, it is necessary to adjust the insertion depth of the connecting pin 84 manually as shown with the phantom line (two-dot chain line). Moreover, there is a risk that the connecting pin 84, when in a free state of being, might fall (disengaged) out by its own weight until the brake cable 80 is connected to brake lever 71 by pulling the inner cable 81. Therefore, it is necessary to retain the connecting pin 84 by fingertips as shown with the phantom line (two-dot chain line). In addition, when the brake cable 80 is inserted, it is necessary to adjust the insertion depth of the clevis 82 by fingers, which is opposite of the above-mentioned fingers for adjusting the insertion depth of the connecting pin 84, so that the engagement holes 82b, 82b of the clevis 82 is positioned to allow the connecting pin 84 to be inserted thereinto as shown with the phantom line (two-dot chain line). Furthermore, a large and complex shaped spring member 90 is provided as an independent, essential component, thereby increasing production cost, such as material cost and processing cost and also increasing the assembly cost because of increasing the processing time due to the addition of the assembly process of the spring member 90 and the confirmation process of non-misassembly. The above-conventional type is disclosed in Japanese provisional patent publication number 2001-349359 (paragraphs 0005-0021, FIGS. 1-4).

SUMMARY OF THE INVENTION

It is an object of the invention to address the problem of the complicated operation when the clevis of the brake cable is connected to the brake lever.

The brake cable connecting apparatus according to the invention mainly comprises a regulating projection in the strut, which regulates the insertion depth of the connecting pin, to reduce the manual, complicated burden of inserting the connecting pin into the clevis of the brake cable.

This invention is a brake cable connecting apparatus, which comprises a strut having a first shoe engagement portion which engages with one brake shoe and two facing surface walls which extend from a portion adjacent to the first shoe engagement portion in a direction away from the one brake shoe; a brake lever positioned in a space between the two facing surface walls, having a pivot portion which is pivotally supported on a free end of the two facing surface walls, a second shoe engagement portion which engages with the other brake shoe adjacent to the pivot portion, and a cable connecting groove formed on a free end away from the second engagement portion thereof; and a brake cable which is connected to the cable connecting groove via a connecting pin; the brake actuating mechanism moves the brake shoes away from each other as a result of relative rotation of the strut and brake lever about the pivot portion by operation of the brake cable, and the drum brake comprises a resilient member; if two facing plates of a clevis of the brake cable are placed into a space between the two facing surface walls of the strut and the brake lever and engagement holes of the clevis are positioned to allow engagement with the connecting pin, and then if the brake cable is pulled in the cable operating direction to connect to the free end of the brake lever while the connecting pin engages with the engagement holes, then the resilient member is deformed to allow the connecting pin to move into the cable connecting groove of the brake lever, and the brake actuating mechanism comprises a cable disengagement restriction portion, the cable disengagement restriction portion prevents the disengagement of the clevis from the free end of the brake lever if the brake cable moves in a cable releasing direction, wherein a regulating projection is formed on the strut to regulate a depth of the insertion of the connecting pin when the connecting pin is inserted into the engagement holes of the clevis. This invention further is the above brake cable connecting apparatus wherein the regulating projection is formed at the side to which the connecting pin moves by its own weight. This invention still further is the above cable connecting apparatus, wherein a stopper restricting an insertion position of the two facing plates of the clevis is provided on the regulating projection of the strut. This invention still further is the above cable connecting apparatus, wherein the strut has a bridge to connect the two facing surface walls with each other and the cable disengagement restriction portion consists of the bridge and the free end of the brake lever. This invention still further is the above brake cable connecting apparatus wherein the resilient member is a shoe return spring. This invention yet further is the above brake cable connecting apparatus wherein the resilient member is a lever return spring extended between the strut and the brake lever.

In the brake cable connecting apparatus according to the invention, the regulating projection, that regulates the insertion depth of the connecting pin, is provided to eliminate the operation of adjusting the insertion depth of the connecting pin to the clevis of the brake cable. Therefore, the connecting pin can be precisely engaged by easy operation of inserting the connecting pin until the end thereof abuts against the regulating projection, thereby eliminating the burden of adjusting the insertion depth of the connecting pin. Moreover, if the regulating projection is formed in the side to which the connecting pin moves by its own weight to prevent the connecting pin from falling off, it is unnecessary to retain the connecting pin by fingertips. Furthermore, if the stopper which regulates the insertion position of the two facing plates of the clevis is added to the regulating projection of the strut, just by inserting the brake cable until the end of the clevis abuts against the strut, the engagement holes of the clevis move to a position where the connecting pin can be easily inserted; therefore, it is unnecessary to adjust the insertion position of the two facing plates of the clevis. In addition, because the cable disengagement restriction portion and resilient member can be formed by existing parts, this invention reduces not only the material cost but the processing cost, thereby reducing the production cost and the assembly cost.

BRIEF DESCRIPTION OF THE DRAWINGS

A better understanding of the present invention will be had when reference is made to the accompanying drawings, wherein identical parts are identified by identical reference numbers and wherein.

DESCRIPTION OF THE PREFERRED EMBODIMENTS

The brake cable connecting apparatus according to the invention has realized the purpose of reducing the burden of manual operation with a simple configuration whereby the connecting pin is inserted into the clevis of the brake cable. The first embodiments of the invention will be explained next in detail.

First Embodiment

<A> Structure/Configuration

Figure 1:
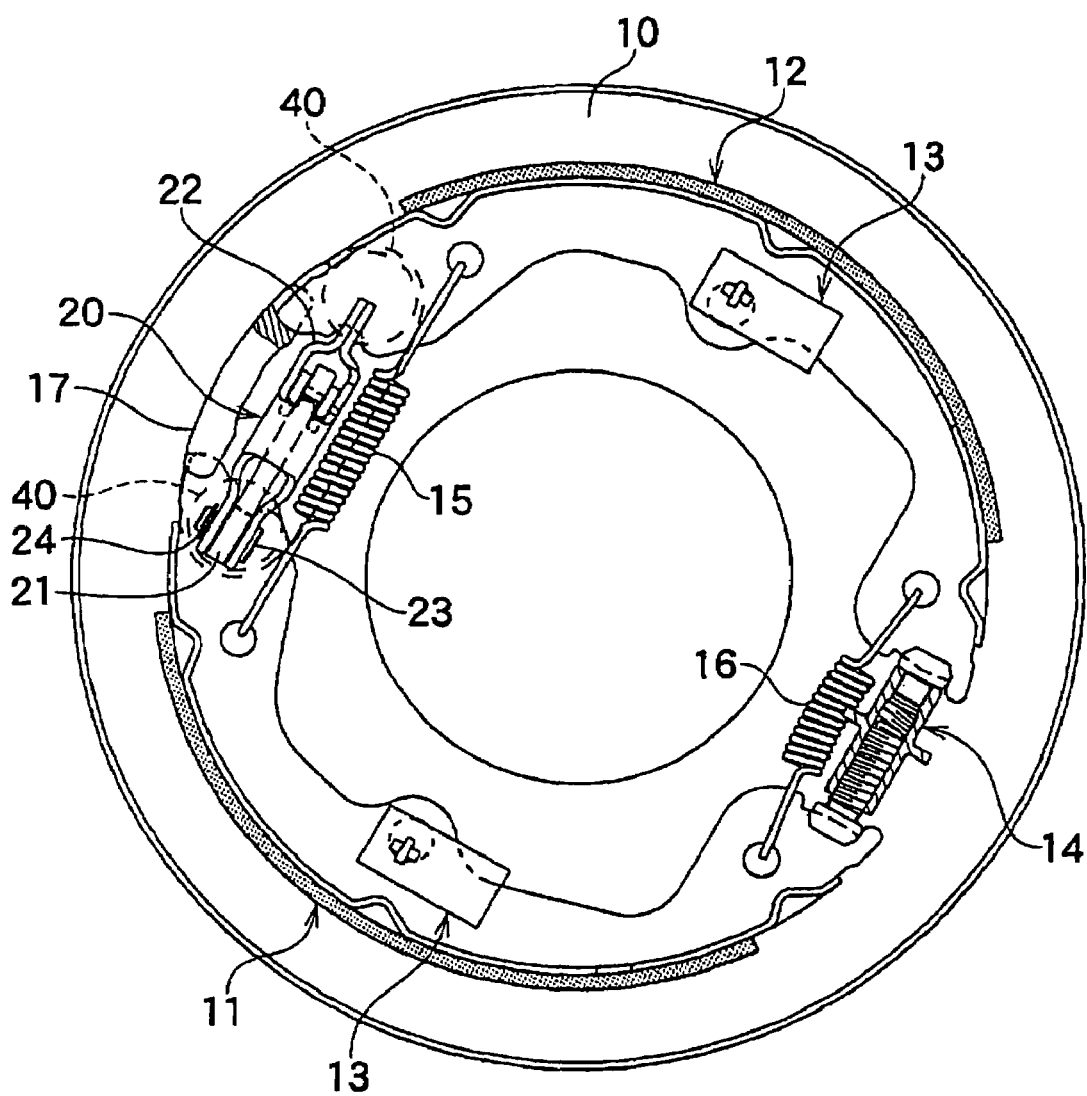
FIG. 1 is a plan view showing an example of the drum brake with the brake cable connecting apparatus of a first embodiment.

The brake cable connecting apparatus of the first embodiment of the invention will be explained with reference to FIGS. 1-9. FIG. 1 shows a plan view of a mechanical drum brake device with a brake cable connecting apparatus. The drum brake device is such that a pair of brake shoes 11, 12 are moveably supported by shoe hold mechanisms 13, 13 on a back plate 10 fixed to a stationary part (not shown in FIG. 1) of a vehicle body while one adjacent ends are supported by an anchor 17, and the other adjacent ends are connected to a connecting member 14. Both ends of the brake shoes 11, 12 abut against and are retained by an anchor 17 and a connecting member 14 by a pair of shoe return springs 15, 16 extended between both brake shoes 11, 12. A brake actuating mechanism 20, extending between both brake shoes 11, 12, that comprises a plate-like brake lever 21, a strut 22, a pivot pin 23, and a washer 24 as shown in FIGS. 2-5 and is positioned between both brake shoes 11 and 12 adjacent to a wall 17a of the anchor 17. The anchor 17 comprises the wall 17a and a base 17b, together making an L shape in cross section, and the base 17b is fixed to a stationary part 100 of the vehicle body while sandwiching the back plate 10 therebetween by screwing nuts (not shown in the figure) on insertion bolts 40. A brake cable 30 is connected to a free end 21c of a brake lever 21 and transfers the operation force of a parking lever (not shown in the figure) in a vehicle to the brake lever 21, where the brake cable 30 comprises an inner cable 31, a clevis 32, and an outer casting 33, wherein the clevis 32 is connected to the brake lever 21 via a connecting pin 34. The configuration of the invention will be explained in detail next.

Figure 3:
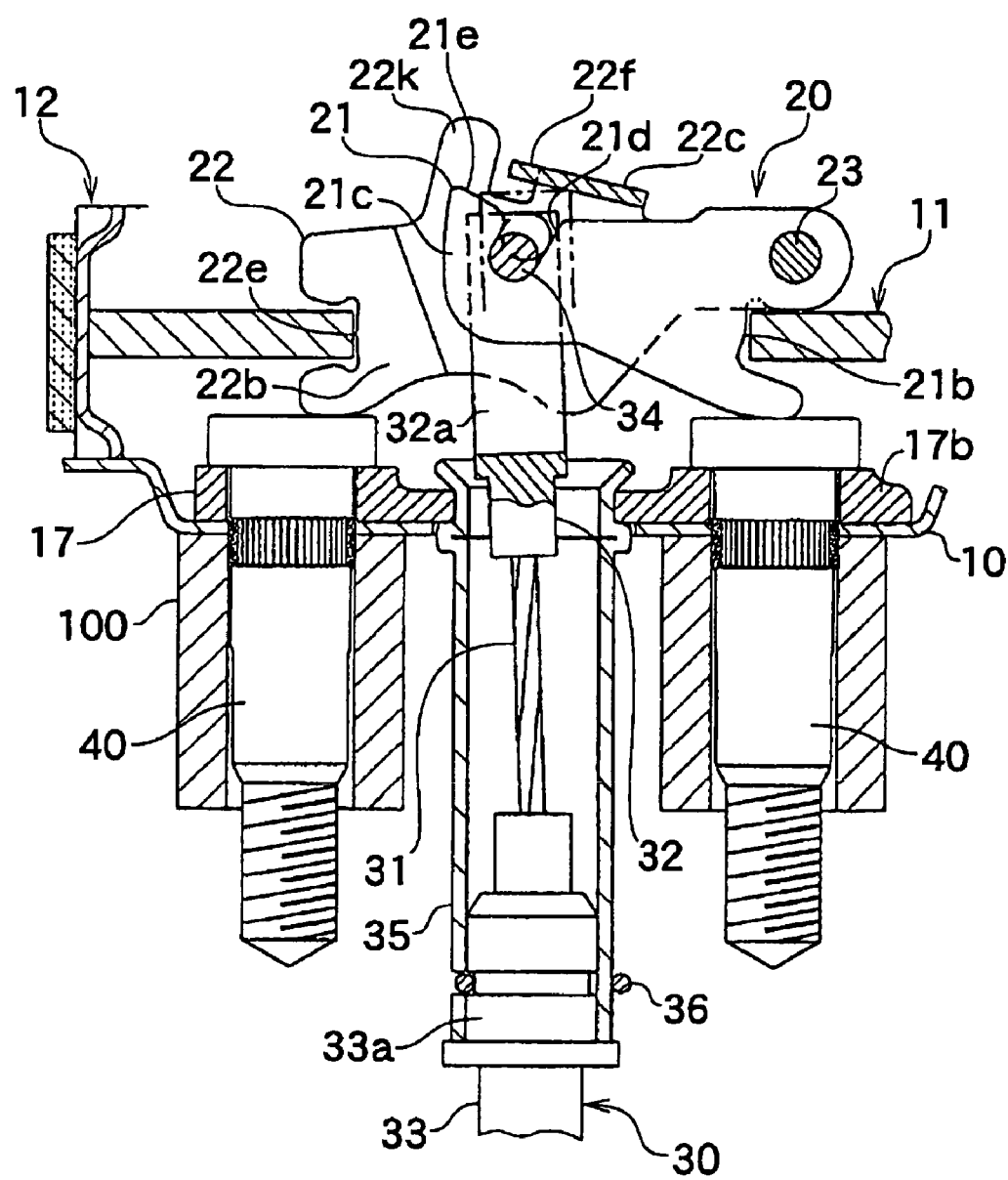
FIG. 3 is a cross-section view taken along the line III-III of FIG. 2.
Figure 4:
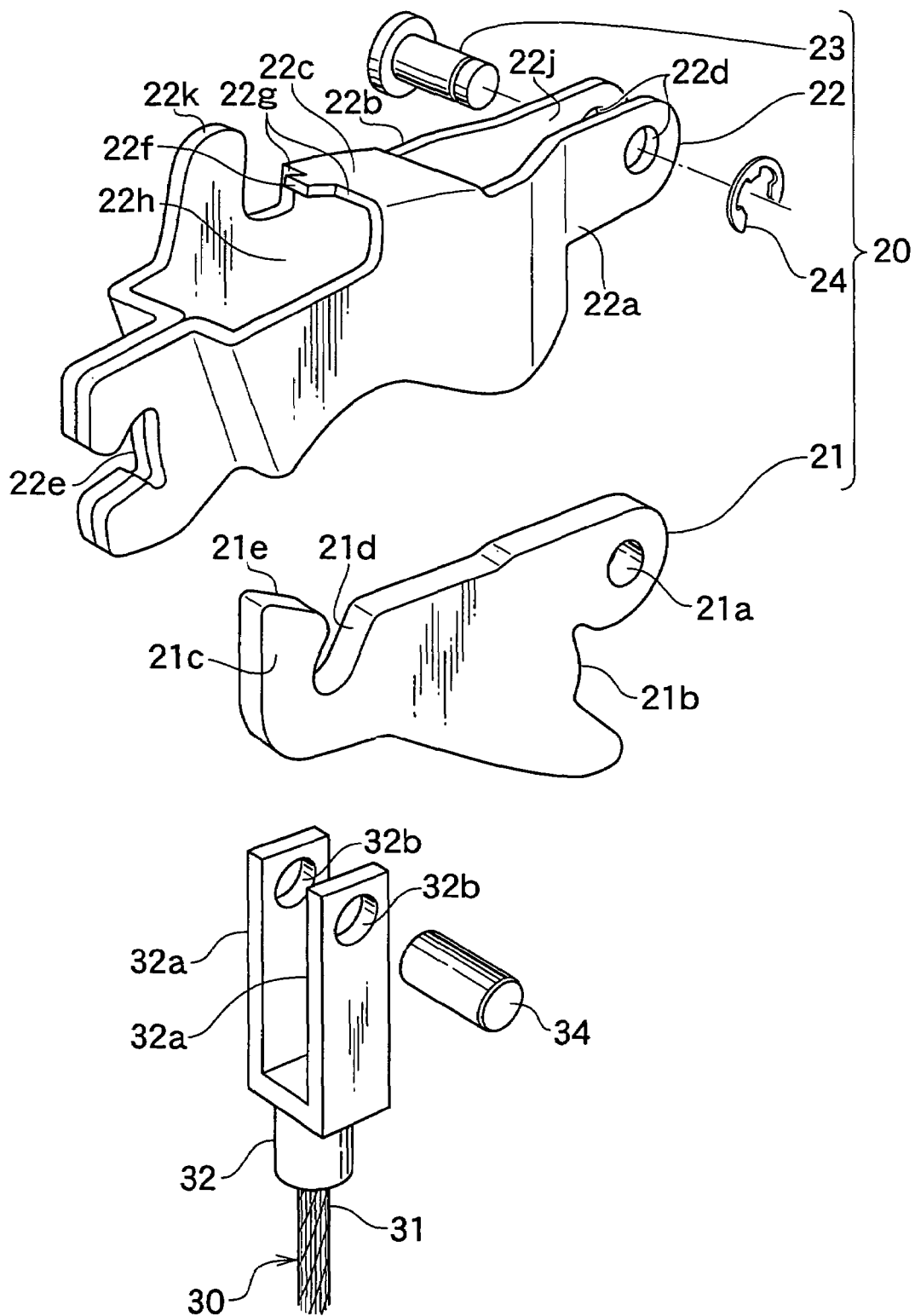
FIG. 4 is an exploded isometric view of the brake cable connecting apparatus of the first embodiment.

The brake lever 21 is made of a piece of plate and has a shoe engagement groove 21b, which engages with one brake shoe 11, and a pivot hole 21a where the pivot pin 23 is inserted at one end of the brake lever 21. The strut 22 is made of a piece of plate and is folded to make a U-shape with a pair of two facing surface walls 22a, 22b to retain the brake lever 21 therebetween and a bridge 22c at a longitudinal intermediate portion thereof. Moreover, left ends of the two facing surface walls 22a, 22b in FIGS. 3 and 4 are superposed on each other and are fixed, such as by welding. A wider space 22h, which can retain the free end 21c of the brake lever 21 and the two facing plates 32a, 32a of the clevis 32, is formed between the two facing surface walls 22a, 22b at a longitudinal intermediate portion, and a narrower space 22j following the wider space 22h is formed. The superposed portion of the two facing surface walls 22a, 22b has a shoe engagement groove 22e, and pivot holes 22d, 22d are formed at the right ends of the strut 22 where the narrower space is formed. The above-described brake lever 21 is pivotally supported on the strut 22 via the pivot pin 23 which is inserted though the pivot holes 22d, 21a, 22d in order and where a washer 24 is clipped on an end thereof. In FIGS. 3 and 4, a cable connecting groove 21d (which is connected to the clevis 32 via the connecting pin 34), and a seating 21e (which temporarily places the connecting pin 34 that is engaged with the clevis 32) are formed on the upper side of the free end 21c of the brake lever 21.

The bridge 22c is formed with a sloping surface as shown in FIG. 3, thereby guiding the ends of the two facing plates 32a, 32a of the clevis 32 smoothly along the sloping surface when the brake cable 30 is connected to the brake lever 21.

Moreover, a projection 22f, which together with the free end 21c of the brake lever 21 comprises a cable disengagement restriction portion, is formed on the bridge 22c, and steps 22g, 22g are formed on both sides of the projection 22f, allowing the two facing plates 32a, 32a of the clevis 32, a component of the brake cable 30, to pass therethrough.

The relationship between the bridge 22c of the strut 22 and the free end 21c of the brake lever 21 is to allow the connecting pin 34 to pass therebetween when the brake lever 21 rotates against the spring force of the shoe return springs 15, 16 as resilient members, and prevents the connecting pin 34 from passing therebetween when the brake cable 30 is tend to disengage from the cable connecting groove 21d.

The steps 22g, 22g of the bridge 22c function to minimize the degree of leaning of the clevis 32 in the direction to the left side, as shown in FIG. 3, when the brake cable 30 is inserted to a position where the connecting pin 34 is engaged with the engagement holes 32b, 32b of the clevis 32. If the degree of leaning of the clevis 32 becomes large, a position where the connecting pin 34 is engaged greatly shifts to the left side shown in FIG. 3, and the seating 21e to temporarily place the connecting pin 34 also shifts to the left side, thereby requiring the longer free end 21c of the brake lever 21. Subsequently, the brake actuating mechanism 20 needs to become longer as a whole, thereby impacting on the cost and the layout. The above-described sloping surface and steps 22g, 22g both of the bridge 22c of the strut 22 are not essential components.

Figure 2:
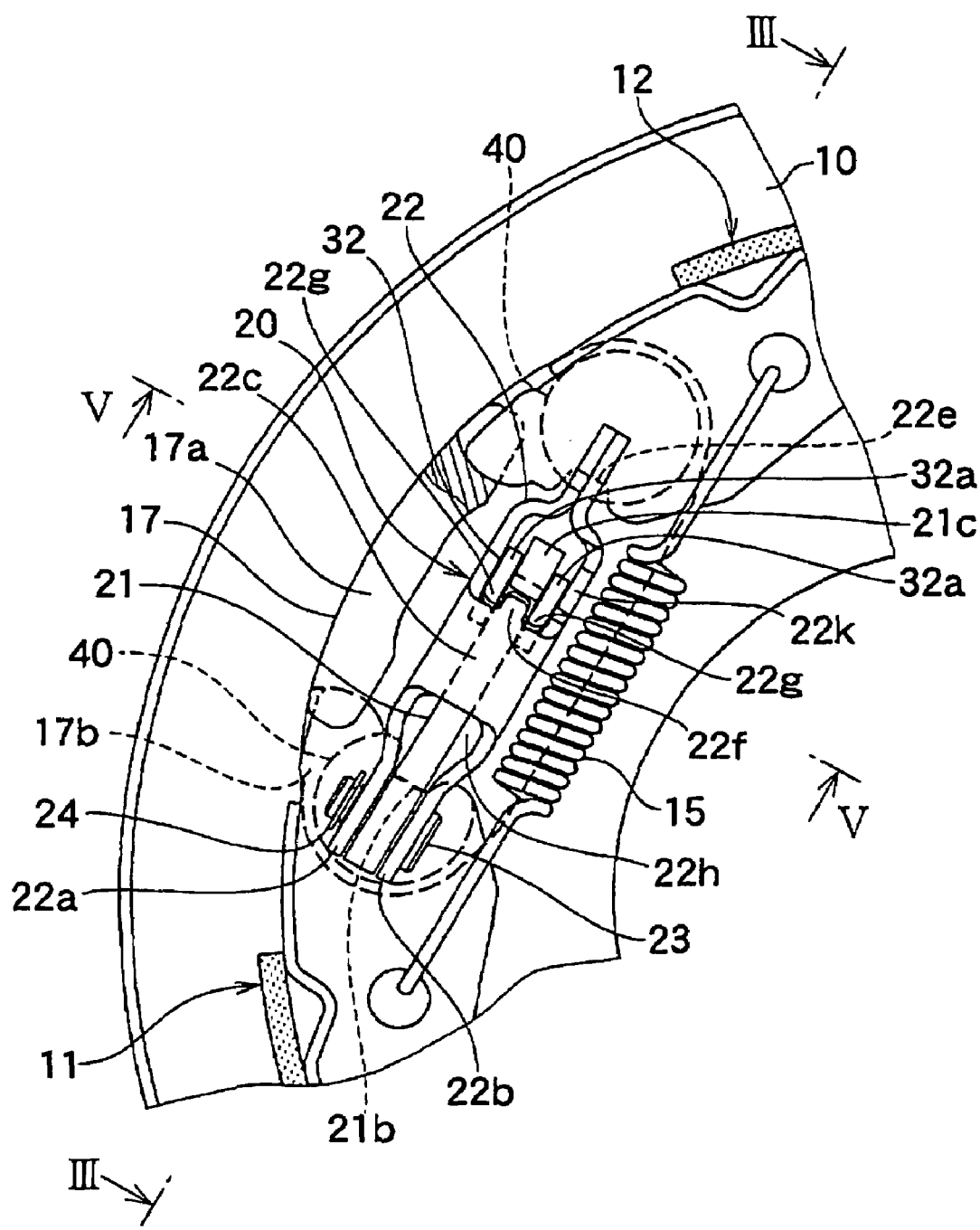
FIG. 2 is an enlarged view of the main part of FIG. 1.

The invention provides a regulating projection 22k on the strut 22 to regulate the insertion depth of the connecting pin 34 constantly when the connecting pin 34 is engaged with the clevis 32 in the operation of connecting the brake cable 30 to the brake lever 21. The regulating projection 22k is formed on one of the two facing surface walls 22a, 22b of the strut 22 at the cable releasing side and functions to prevent over-insertion of the connecting pin 34 when the connecting pin 34 is inserted from one side of the two facing plates 32a while the engagement holes 32b, 32b of the clevis 32 are placed on the upper side of the strut 22 shown in FIGS. 3-5. As shown in FIGS. 1-2, the embodiment shows the regulating projection 22k is formed on one of the two facing surface walls 22b in the central side of the brake when the brake actuating mechanism 20 is placed above a horizontal line passing through the center of the drum brake.

The configuration of the regulating projection 22k, such as location, size and shape, is not limited to the embodiments shown in the figures because the regulating projection 22k has only to prevent movement of the above-described connecting pin 34.

Figure 5:
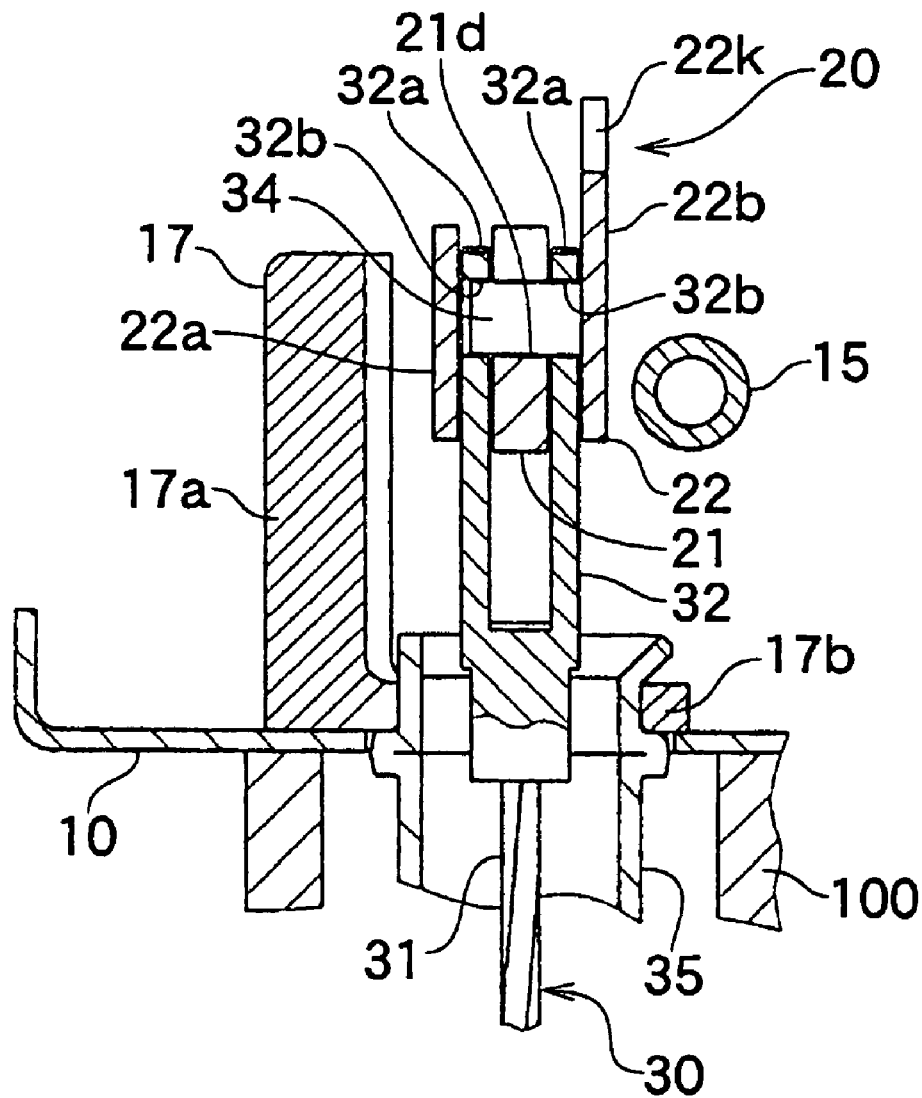
FIG. 5 is a cross-section view taken along the line V-V of FIG. 2.

The brake cable 30 disclosed in FIGS. 3-5 is comprised of the inner cable 31 and the outer casing 33, and one end at the drum brake side is structured as follows. One end of the brake cable 30 is inserted into a guide pipe 35 fixed to the base 17b of the anchor 17 at one end of the guide pipe 35, and a casing cap 33a of the outer casing 33 fits in the other end of the guide pipe 35 and is clipped by a ring 36.

As shown in FIG. 4, the clevis 32 fixed to the end of the inner cable 31 has a pair of the two facing plates 32a, 32a spaced to retain the brake lever 21 therebetween, and each of the two facing plates 32a, 32a has the engagement holes 32b, 32b formed in the same axial line to insert the connecting pin 34 therethrough.

When the free end 21c of the brake lever 21 is retained in the groove formed between the pair of the two facing plates 32a, 32a, the groove is sufficiently deep so that the engagement holes 32b, 32b of the clevis 32 can be exposed upward from the free end 21c of the brake lever 21 in FIGS. 3-5.

The connecting pin 34 penetrates and is extended between the end of the two facing plates 32a, 32a of the clevis 32 and directly slides into the inner circumference surface of the cable connecting groove 21d formed on the free end 21c of the brake lever 21. The entire length of the connecting pin 34 is designed to be shorter than the width between the two facing surface walls 22a, 22b of the strut 22, so that the connecting pin 34 is able to be inserted into the engagement holes 32b, 32b of the clevis 32, thereby laterally bridging between the two facing plates 32a, 32a. The length of the connecting pin 34 is designed to have an engagement margin between the engagement holes 32b, 32b of the clevis 32 even if one side of the connecting pin 34 abuts against the inner surface of either one of the two facing surface walls 22a, 22b of the strut 22.

<B> Process of Connecting the Brake Cable

Figure 6:
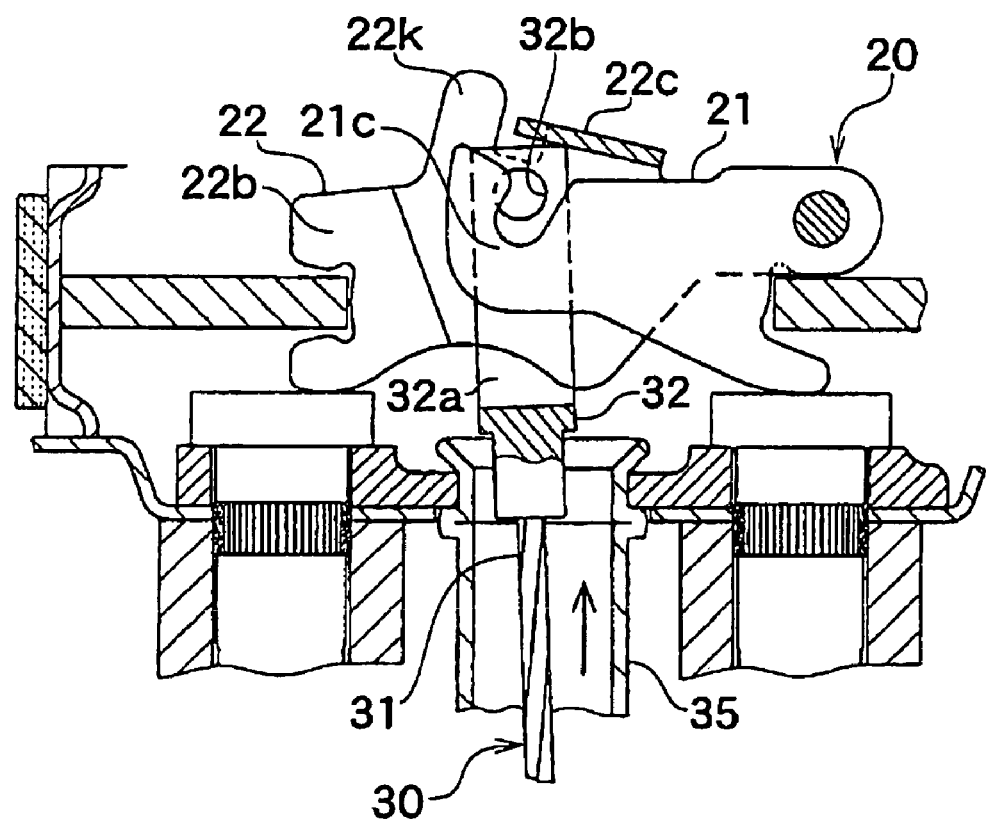
FIG. 6 is a view explaining operation of the brake cable connecting apparatus of the first embodiment and explaining a condition where the clevis abuts against the tilting bridge of the strut.

Referring to FIGS. 6-9, a process of connecting the brake cable 30 to the brake lever 21 will be explained next. The clevis 32 is inserted into the strut 22 through the inside of the guide pipe 35 by forwarding the inner cable 31 which is held by the fingertips. While the free end 21c of the brake lever 21 is retained in the groove formed between the two facing plates 32a, 32a of the clevis 32, a pair of the two facing plates 32a, 32a moves into each space formed between the two facing surface walls 22a, 22b of the strut 22 and the free end 21c of the brake lever 21, and the end of the clevis 32 reaches the guiding surface (the above-mentioned sloping surface) of the bridge 22c of the strut 22 (FIG. 6).

The end of the clevis 32 slides along the guiding surface of the bridge 22c of the strut 22, and the clevis 32, while tilting (so-called head swing) gradually keeps moving into the top of the free end 21c of the brake lever 21. When the end of the clevis 32 reaches the steps 22g, 22g of the bridge 22c (see FIG. 2 and FIG. 4), the end of the clevis 32 slides and moves into the steps 22g, 22g, and the side of the two facing plates 32a, 32a keeps moving into the lower part of the steps 22g, 22g by the resilience of the inner cable 31. When the inner cable 31 is further inserted, the clevis 32 reaches a position where the engagement holes 32b, 32b of the two facing plates 32a, 32a are exposed entirely from the opening of the strut 22.

The connecting pin 34 is inserted into the engagement holes 32b, 32b of the clevis 32 from the side where the regulating projection 22k is not formed, and closes the opening of the pair of the two facing plates 32a, 32a. In the engagement holes 32b, 32b of the clevis 32, the engagement holes 32b of the two facing plates 32a, placed in the central side of the brake, are closed by the restricting projection 22k, even if the connecting pin 34 is strongly inserted. Therefore, the connecting pin 34 can be inserted into the clevis 32 at a constant depth (see FIG. 7 and FIG. 8) due to restriction of the movement by the restricting projection 22k.

As described, because the connecting pin 34 can be engaged with the two facing plates 32a, 32a of the clevis 32 by easily inserting the connecting pin 34 until the end of the connecting pin 34 abuts against the regulating projection 22k of the strut 22, the burden of adjusting the insertion depth of the connecting pin 34 by fingertips can be eliminated, thereby improving the connecting operation of the brake cable 30 to the brake lever 21.

After the connecting pin 34 is engaged with the engagement holes 32b, 32b, the inner cable 31 is pulled against the return force of the brake lever 21 by the shoe return springs 15, 16, and the connecting pin 34 that is laterally bridged between the two facing plates 32a, 32a of the clevis 32 can be retained and engaged with the cable connecting groove 21d of the free end 21c of the brake lever 21.

Figure 7:
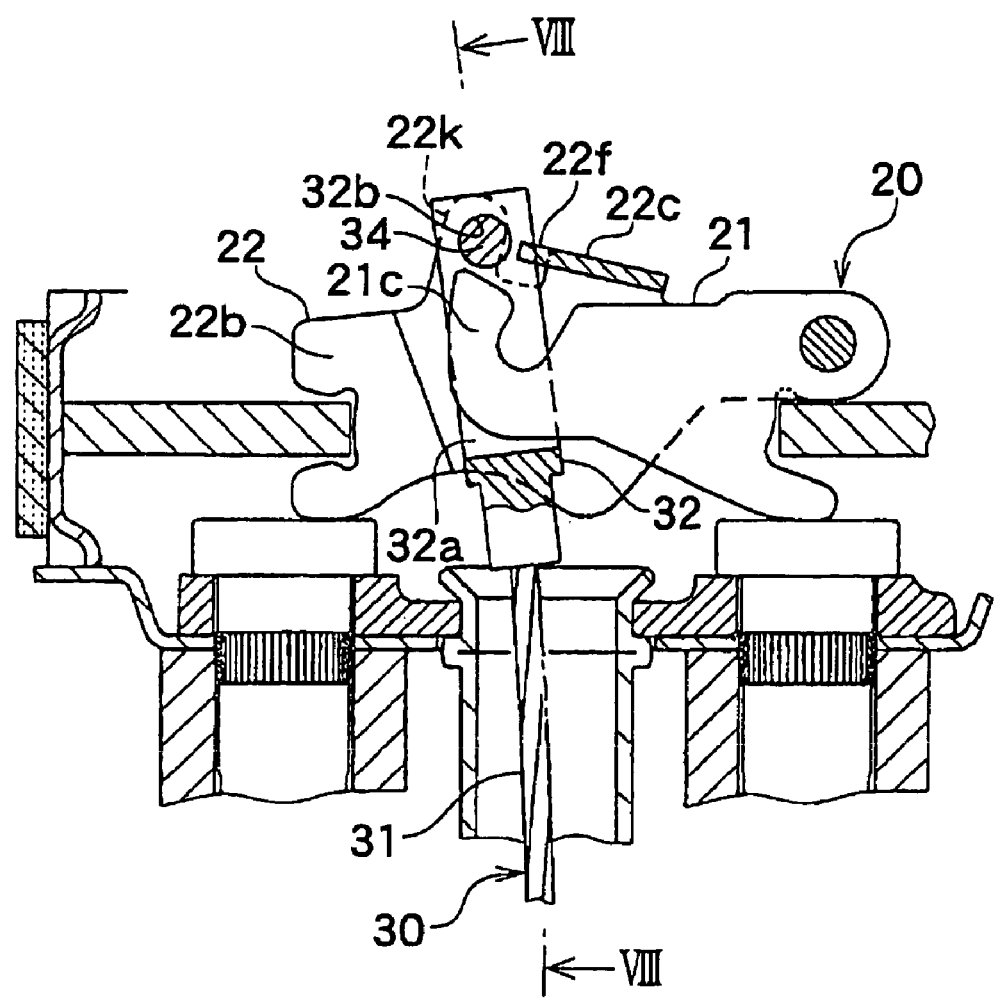
FIG. 7 is a view explaining operation of the brake cable connecting apparatus and explaining a condition where the engagement holes of the clevis are exposed from the strut.
Figure 8:
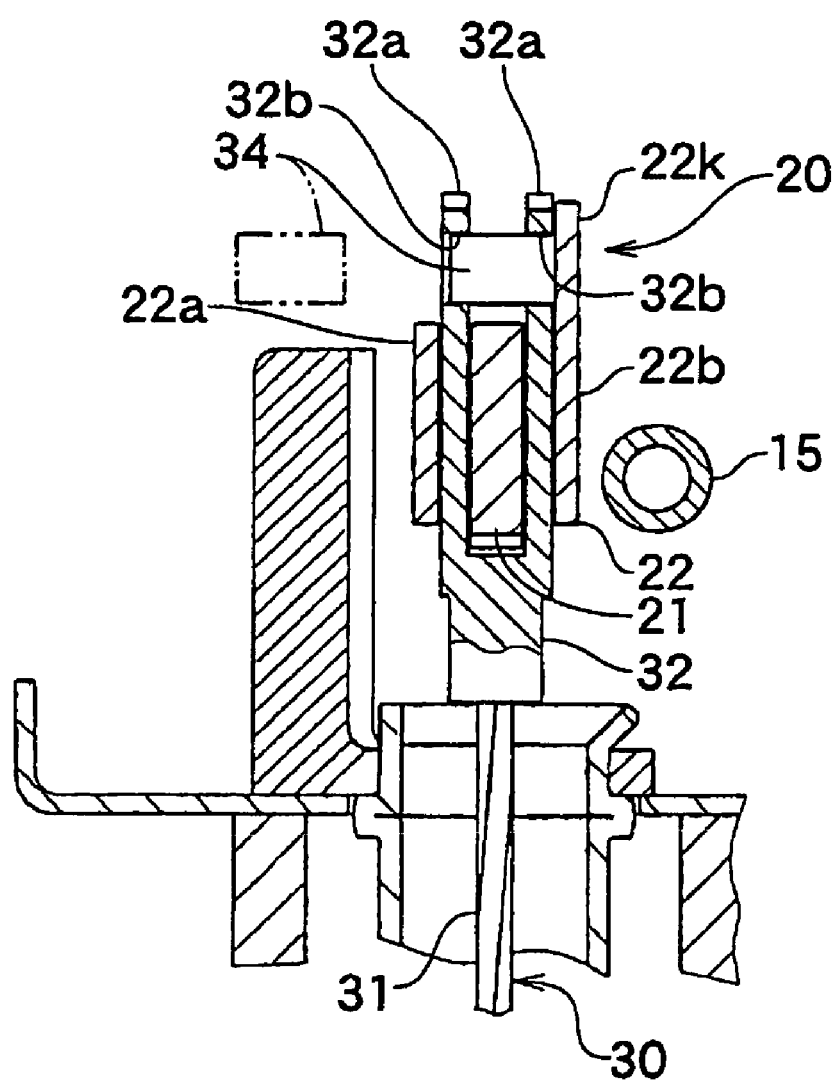
FIG. 8 is a cross-section view taken along the line VIII-VIII of FIG. 7 and explaining a condition where the connecting pin is inserted into the engagement holes of the clevis.
Figure 9:
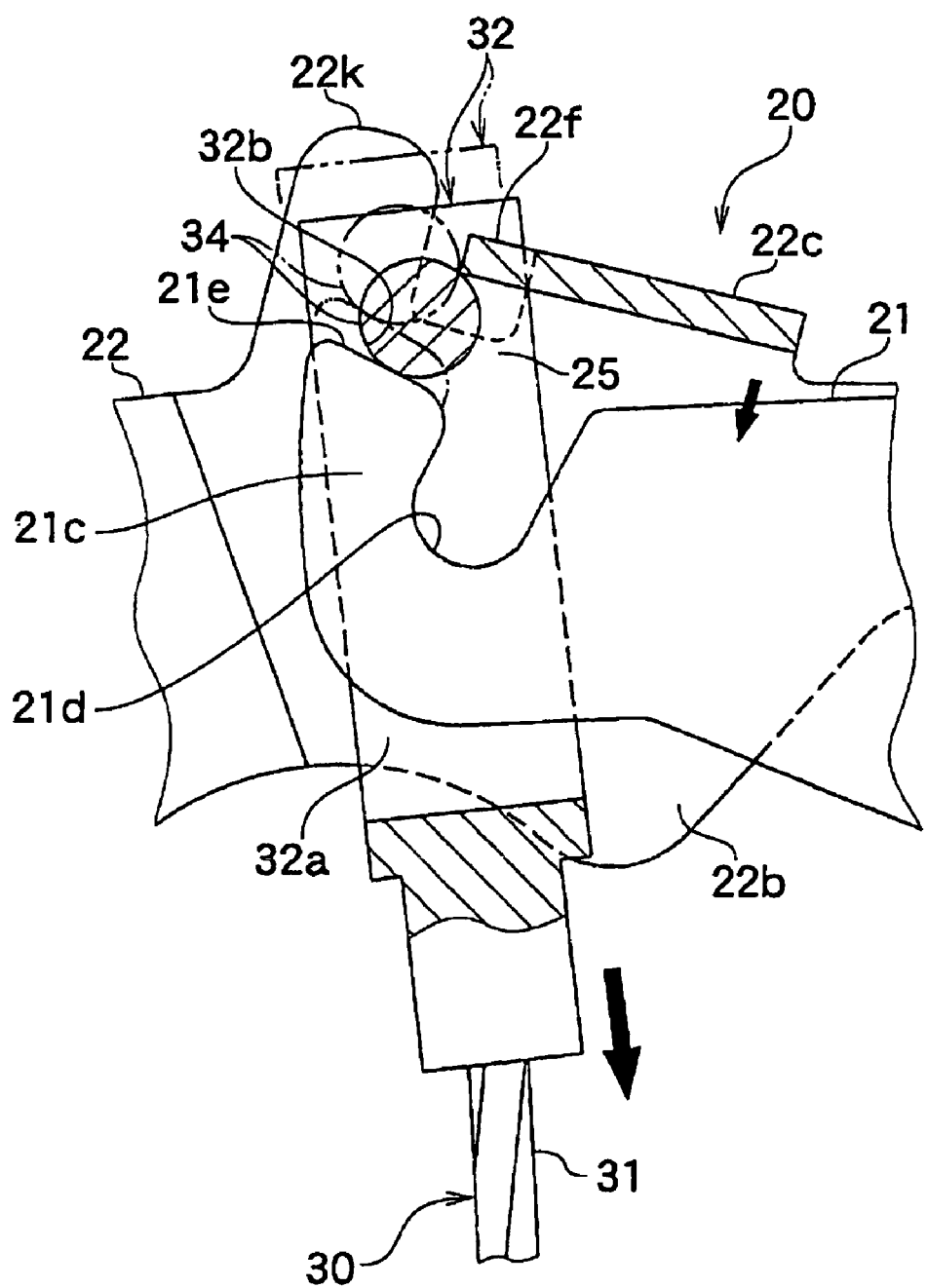
FIG. 9 is an enlarged view explaining the process where the clevis is connected to the brake lever.

From the condition where the connecting pin 34 is engaged shown in FIG. 7 and FIG. 8, a process of connecting the clevis 32 to the free end 21c of the brake lever 21 will be described in detail with reference to FIG. 9. The phantom line (two-dot chain line) in FIG. 9 shows the seating 21e of the brake lever 21, the clevis 32 and the connecting pin 34 in the condition after the inner cable 31 is pulled and before the brake lever 21 rotates. Under this condition, because the gap 25 formed between the projection 22f of the bridge 22c of the strut 22 and the free end 21c of the brake lever 21 is smaller than the diameter of the connecting pin 34, the connecting pin 34 abuts against the projection 22f and the seating 21e.

From this condition, if the inner cable 31 is further pulled and the connecting pin 34, now engaged with the clevis 32, pushes down the seating 21e of the brake lever 21 and the brake lever 21 then rotates in the cable operating direction around the pivot pin 23 (not shown in FIG. 9). The gap 25 formed between the projection 22f of the strut 22 and the free end 21c of the brake lever 21 gradually widens while the brake lever 21 rotates. If the inner cable 31 is further pulled, the brake lever 21 further rotates. Therefore the end of the two facing plates 32a, 32a of the clevis 32 passes the bridge 22c of the strut 22, and then the connecting pin 34 is retained in and engaged with the cable connecting groove 21d of the brake lever 21.

After the pulling of the inner cable 31 is released, the brake lever 21 rotates in the cable releasing direction by the return force of the shoe return springs 15, 16, and returns to the initial condition, and the cable disengagement restriction portion, consisting of the bridge 22c of the strut 22 and the free end 21c of the brake lever 21, also returns to its initial condition.

After the clevis 32 is connected to the free end 21c of the brake lever 21, as shown with the phantom line (two-dot chain line) in FIG. 3, the end of the clevis 32 abuts against the back side (guiding surface) of the bridge 22c of the strut 22, thereby limiting the free movement of the clevis 32 relative to the brake lever 21 in the cable releasing direction. This configuration prevents the clevis 32 from moving to a position where the connecting pin 34 falls out from the engagement holes 32b, 32b, thereby preventing inadvertent disengagement of the brake cable 30 from the brake lever 21 while transporting the drum brake.

As mentioned, the return force of the brake lever 21 can be obtained from the existing shoe return springs 15, 16 as resilient members, which ensures prevention of disengagement of the clevis 32 from the free end 21c of the brake lever 21 without any additional component.

Moreover, when the connection between the clevis 32 and the brake lever 21 is released for a replacement of the brake cable 30 or other reasons, only the brake lever 21 shown in FIG. 3 is forcibly rotated in the cable operating direction by a tool, pushed down and moved to a position where the connecting pin 34 is easily disengaged from the clevis 32 while the inner cable 31 is pushed in the cable releasing direction.

Other embodiments will be explained next, and because practically identical parts as those of the above embodiment are described with the same reference numbers, the details are omitted.

Second Embodiment

<A> Structure

The brake cable connecting apparatus of the second embodiment of the invention will be explained with reference to FIGS. 10-16. The embodiment shows a stopper 22m which functions to prevent over-insertion of the clevis 32 that is added to the regulating projection 22k of the strut 22 in order to arrange the engagement holes 32b, 32b of the clevis 32 to a position where the connecting pin 34 is easily inserted.

Figure 11:
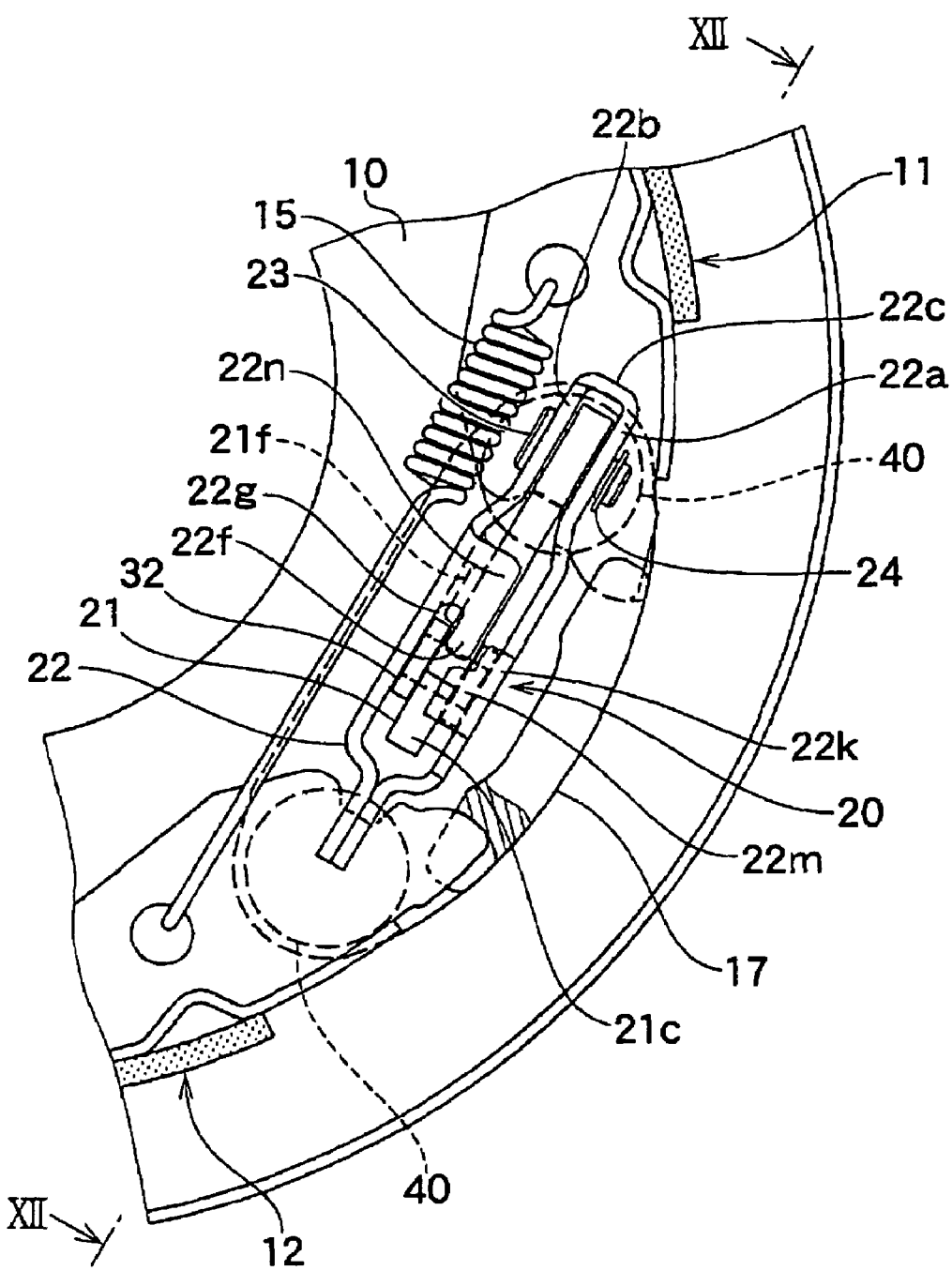
FIG. 11 is an enlarged view of the main part of FIG. 10.
Figure 13:
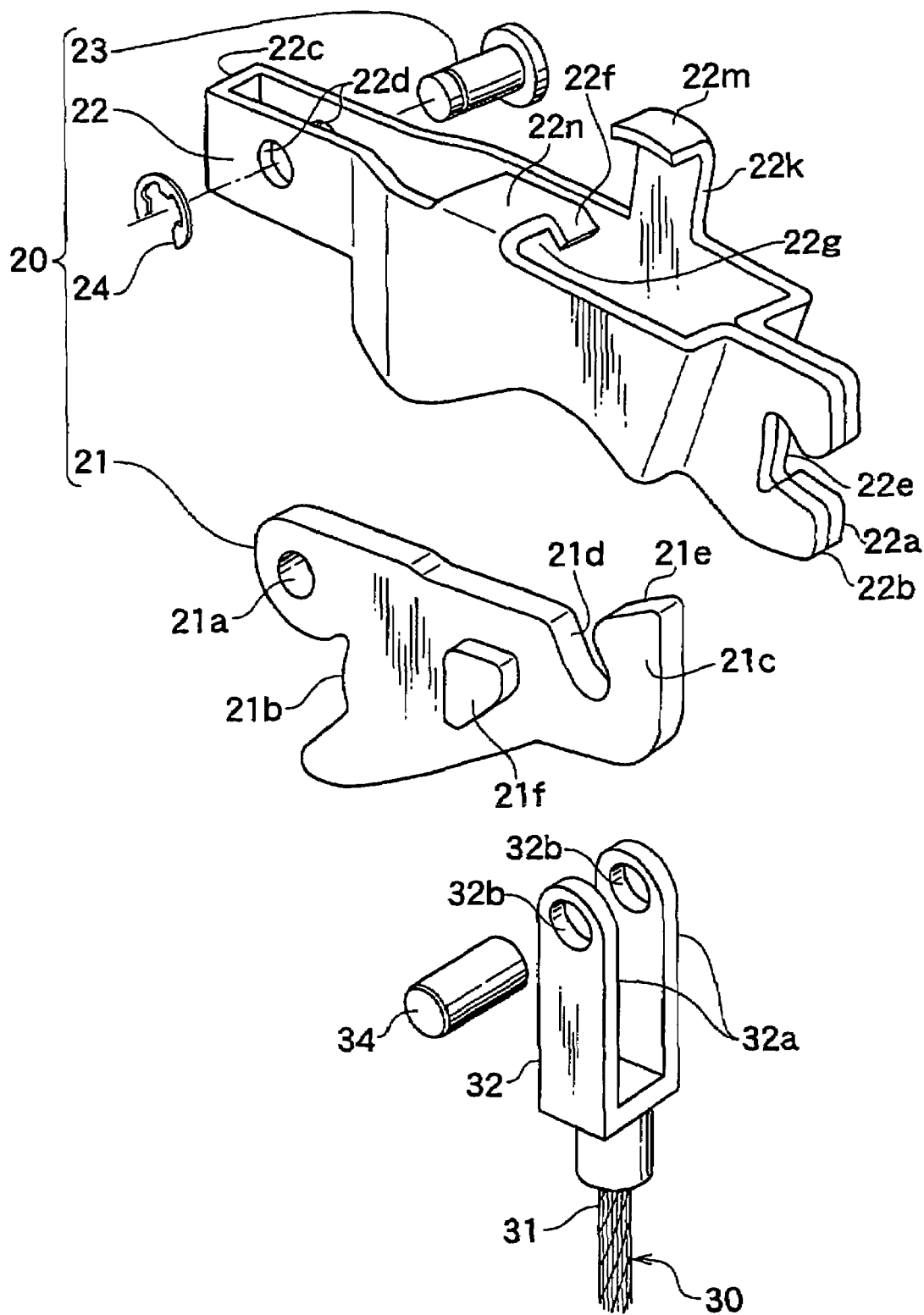
FIG. 13 is an exploded isometric view of the brake cable connecting apparatus of the second embodiment.
Figure 14:
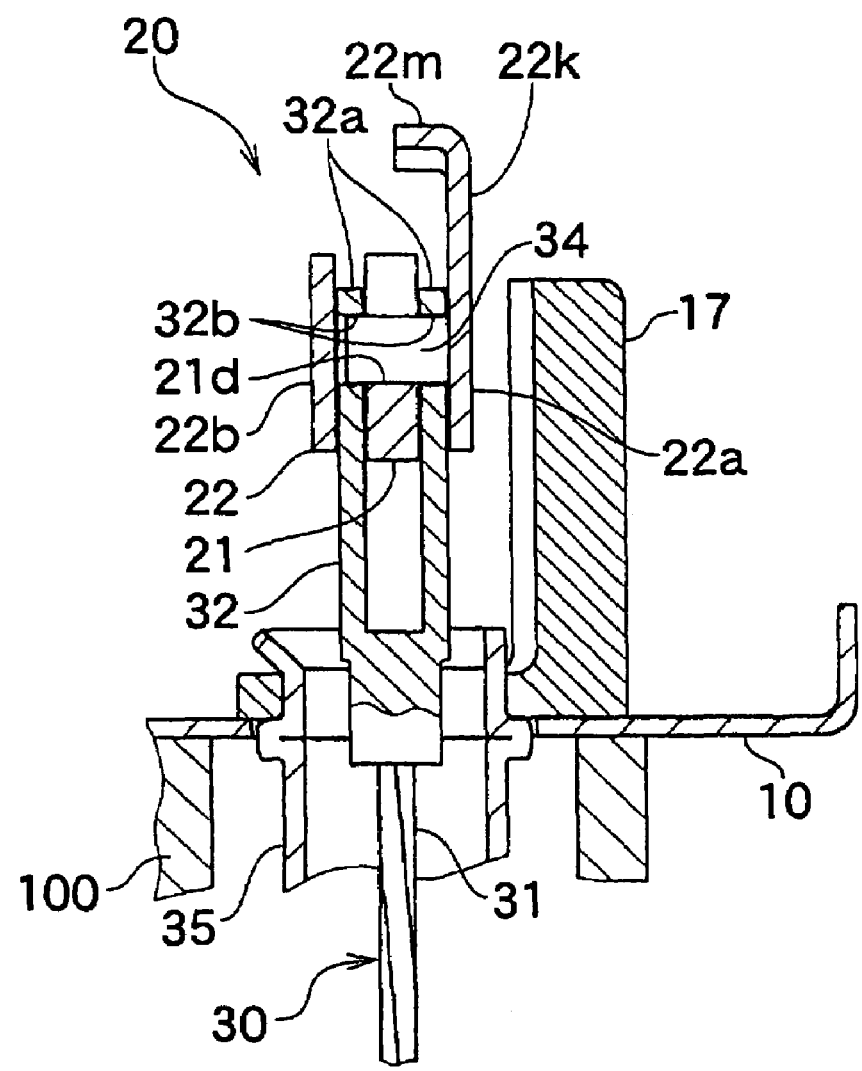
FIG. 14 is a cross-section view taken along the line XIV-XIV of FIG. 12.

As shown in FIG. 11 and FIG. 13, the embodiment shows an example of the regulating projection 22k, to prevent over-insertion of the connecting pin 34, formed on one of the two facing surface walls 22a outside of the brake.

Figure 12:
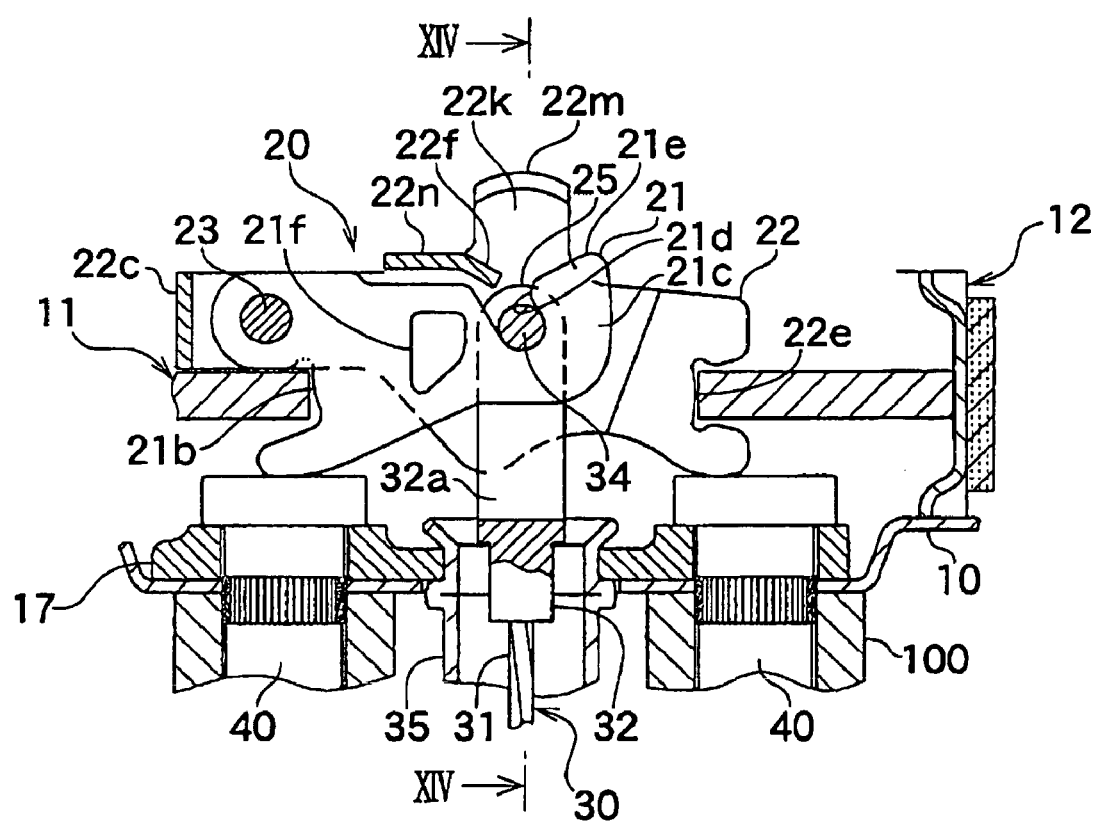
FIG. 12 is a cross-section view taken along the line XII-XII of FIG. 11.

In consideration of the shape when the strut 22 is formed by press work, as shown in FIG. 11-13, the strut 22 of the embodiment has the bridge 22c in a different part from that of the above-described first embodiment.

The stopper 22m is formed by bending the end portion of the regulating projection 22k, which is formed on one facing surface wall 22a, towards the other facing surface wall 22b so as to arrange the engagement holes 32b, 32b of the clevis 32 to a position where the connecting pin 34 is easily inserted. The projection of the stopper 22m is required to be long enough to be able to abut against one or both of the two facing plates 32a, 32a comprising the clevis 32. The embodiment shows an example where the entire shape of the stopper 22m is formed into an arc shape in accordance with the shape of the end of the clevis 32. However, the entire shape is not limited to the arc shape so long as the above-described positioning function is achieved.

As shown in FIGS. 12 and 13, a tongue 22n is formed by bending the other facing surface wall 22b, which is on the opposite side of the regulating projection 22k. The projection 22f is formed by bending the tongue 22n towards the cable operating direction, which is the opposite of the first embodiment. In addition, the projection 22f is placed above the cable connecting groove 21d of the brake lever 21, and the gap 25 between the projection 22f and the free end 21c of the brake lever 21 becomes smaller than the diameter of the connecting pin 34. This configuration controls the movement of the clevis 32 in the cable releasing direction, which can prevent inadvertent disengagement of the brake cable 30 from the brake lever 21.

Also, the guiding portion 21f protrudes from the side of the brake lever 21, which can smoothly guide the end of the clevis 32 along the guiding portion 21f when the brake cable 30 is connected to the brake lever 21.

Figure 10:
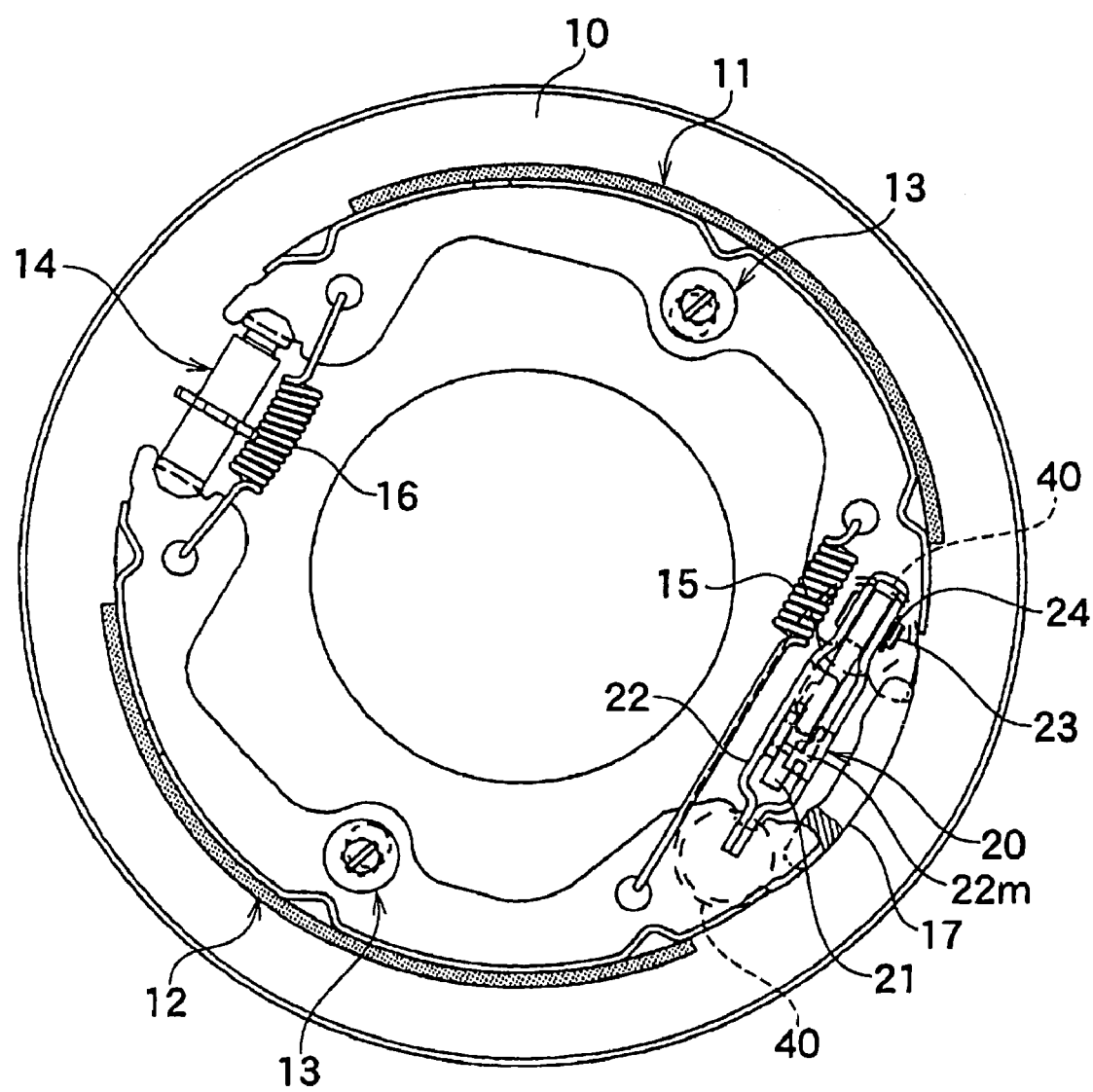
FIG. 10 is a plan view showing an example of the drum brake with the brake cable connecting apparatus of a second embodiment.

Moreover, the drum brake of the embodiment has the brake actuating mechanism 20 below a horizontal line passing through the center of the brake as shown in FIG. 10, and the regulating projection 22k is placed outside of the brake to prevent the connecting pin 34 from failing out by its own weight in the initial stage of the brake cable connecting operation. In addition, the shoe hold mechanisms 13, 13 where a pair of brake shoes 11, 12 are supported on the back plate 10 employ a coil spring. However, the embodiment of the shoe hold mechanisms is not limited to the first or second embodiments.

<B> Process of Connecting the Brake Cable

A process of connecting the clevis 32 to the free end 21c of the brake lever 21 comprising the brake actuating mechanism 20 in the embodiment will be explained next with reference to FIGS. 15-16.

The clevis 32 is inserted into the strut 22 through the inside of the guide pipe 35 by forwarding the inner cable 31 which is held by finger tips. While the free end 21c of the brake lever 21 is retained in the groove formed between the two facing plates 32a, 32a of the clevis 32, a pair of two facing plates 32a, 32a moves into each space formed between the two facing surface walls 22a, 22b of the strut 22 and the free end 21c of the brake lever 21, and in the inserting process of the end of the clevis 32, the end of the clevis 32 is guided towards the stopper 22m formed on the strut 22 while being guided along the guiding portion 21f provided on the side of the brake lever 21.

Figure 15:
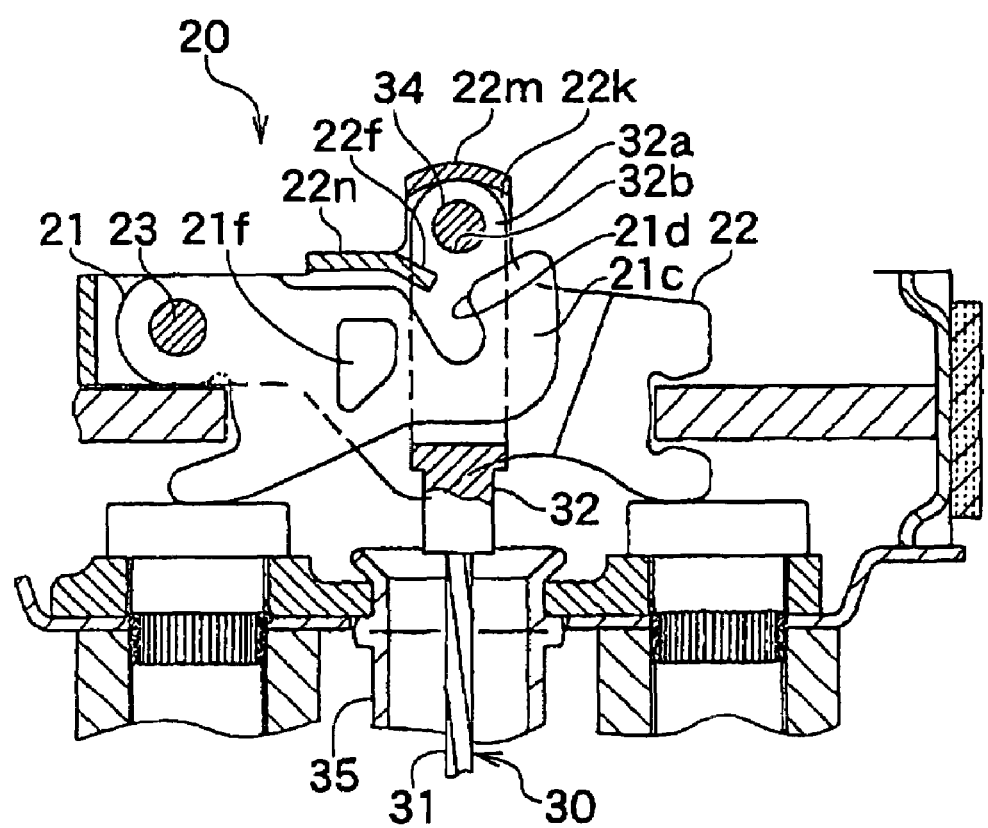
FIG. 15 is a view explaining operation of the brake cable connecting apparatus of the second embodiment and explaining a condition where the connecting pin is inserted into the engagement holes of the clevis which is exposed from the strut.

When the end of the clevis 32 abuts against the stopper 22m of the strut 22, the engagement holes 32b, 32b of the clevis 32 are positioned as shown with one of the engagement holes 32b in FIG. 15, the engagement holes 32b, 32b reach a position where the engagement holes 32b, 32b are exposed entirely from the opening of the strut 22.

As described, the embodiment shows that the engagement holes 32b, 32b of the clevis 32 can be arranged at a position where the connecting pin 34 is easily inserted just by inserting the inner cable 31 until the end of the clevis 32 abuts against the stopper 22m of the strut 22.

The connecting pin 34 is inserted from the side where the regulating projection 22k is not provided into the engagement holes 32b, 32b of the clevis 32 until the end of the connecting pin 34 abuts against the regulating projection 22k of the strut 22. As in the case of the above-described first embodiment, the regulating projection 22k functions to prevent over-insertion of the connecting pin 34.

After the connecting pin 34 is engaged with the engagement holes 33b, 33b, the inner cable 31 is pulled against the return force of the brake lever by the shoe return springs 15, 16, and the connecting pin 34, laterally bridged between the two facing plates 32a, 32a of the clevis 32, can be retained and engaged with the cable connecting groove 21d of the brake lever 21.

From the condition where the connecting pin 34 is engaged as shown in FIG. 15, a process of connecting the clevis 32 with the free end 21c of the brake lever 21 will be described in detail with reference to FIG. 16. The phantom line (two-dot chain line) in FIG. 16 shows the seating 21e of the brake lever 21 and the clevis 32 in the condition after the inner cable 31 is pulled and before the brake lever 21 rotates. Under this condition, because the gap 25 formed between the projection 22f of the tongue 22n of the strut 22 and the free end 21c of the brake lever 21 is smaller than the diameter of the connecting pin 34, the connecting pin 34 abuts against the projection 22f and the seating 21e.

Figure 16:
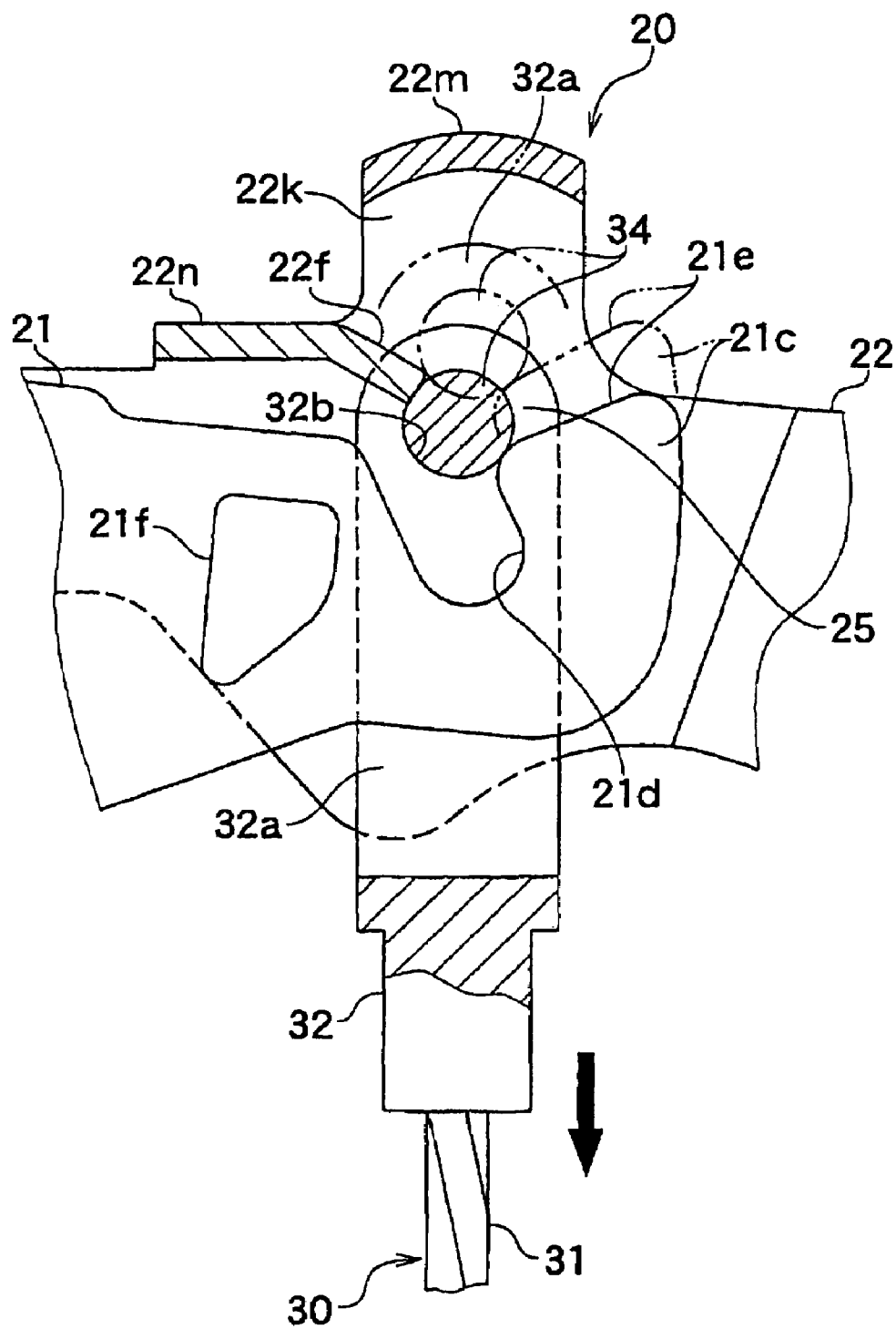
FIG. 16 is an enlarged view explaining the process where the clevis is connected to the brake lever.

From this condition, if the inner cable 31 is further pulled, the connecting pin 34 that is engaged with the clevis 32 pushes down the seating 21e of the brake lever 21, and the brake lever 21 rotates in the cable operating direction around the pivot pin 23 (not shown in FIG. 16). The gap 25 formed between the projection 22f of the strut 22 and the free end 21c of the brake lever 21 gradually widens while the brake lever 21 rotates.

If the inner cable 31 is further pulled, the brake lever 21 rotates further, making the gap 25 larger than the diameter of the connecting pin 34, and the connecting pin 34 is retained in and engaged with the cable connecting groove 21d after passing the gap 25.

After the pulling of the inner cable 31 is released, the brake lever 21 rotates in the cable releasing direction by the return force of the shoe return springs 15, 16, and returns to the initial condition, and the cable disengagement restriction portion that consists of the projection 22f of the strut 22 and the free end 21c of the brake lever 21, also returns to the initial condition. This can prevent inadvertent disengagement of the brake cable 30 from the brake lever 21.

Third Embodiment

The brake cable connecting apparatus of the third embodiment of the invention will be explained with reference to FIGS. 17-19. In the above-explained first and second embodiments, the resilient member, which brings return force to the brake lever 21, is the existing shoe return spring. However, the resilient member can be an independent lever return spring 50 as shown in this third embodiment.

Figure 19:
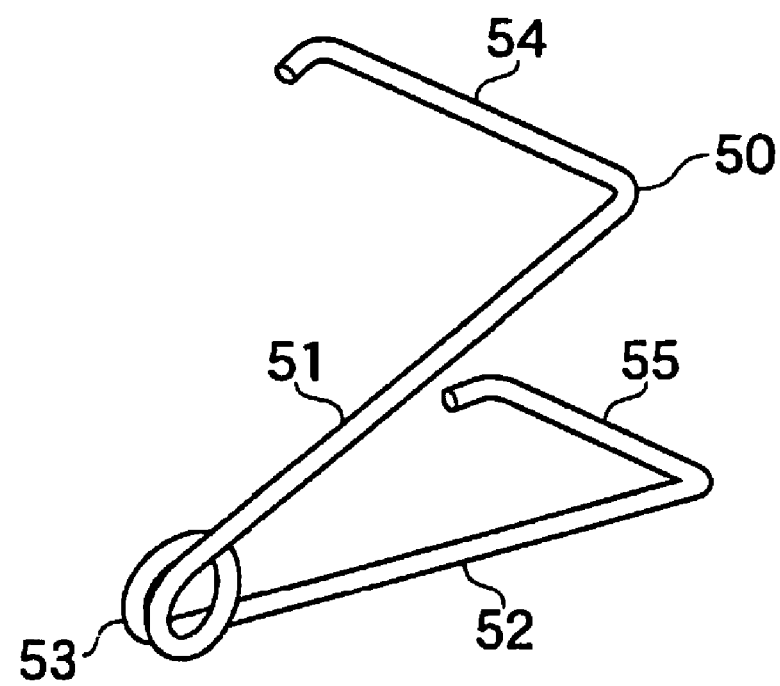
FIG. 19 is an isometric view of the lever return spring of the brake cable connecting apparatus of the third embodiment.
Figure 20:
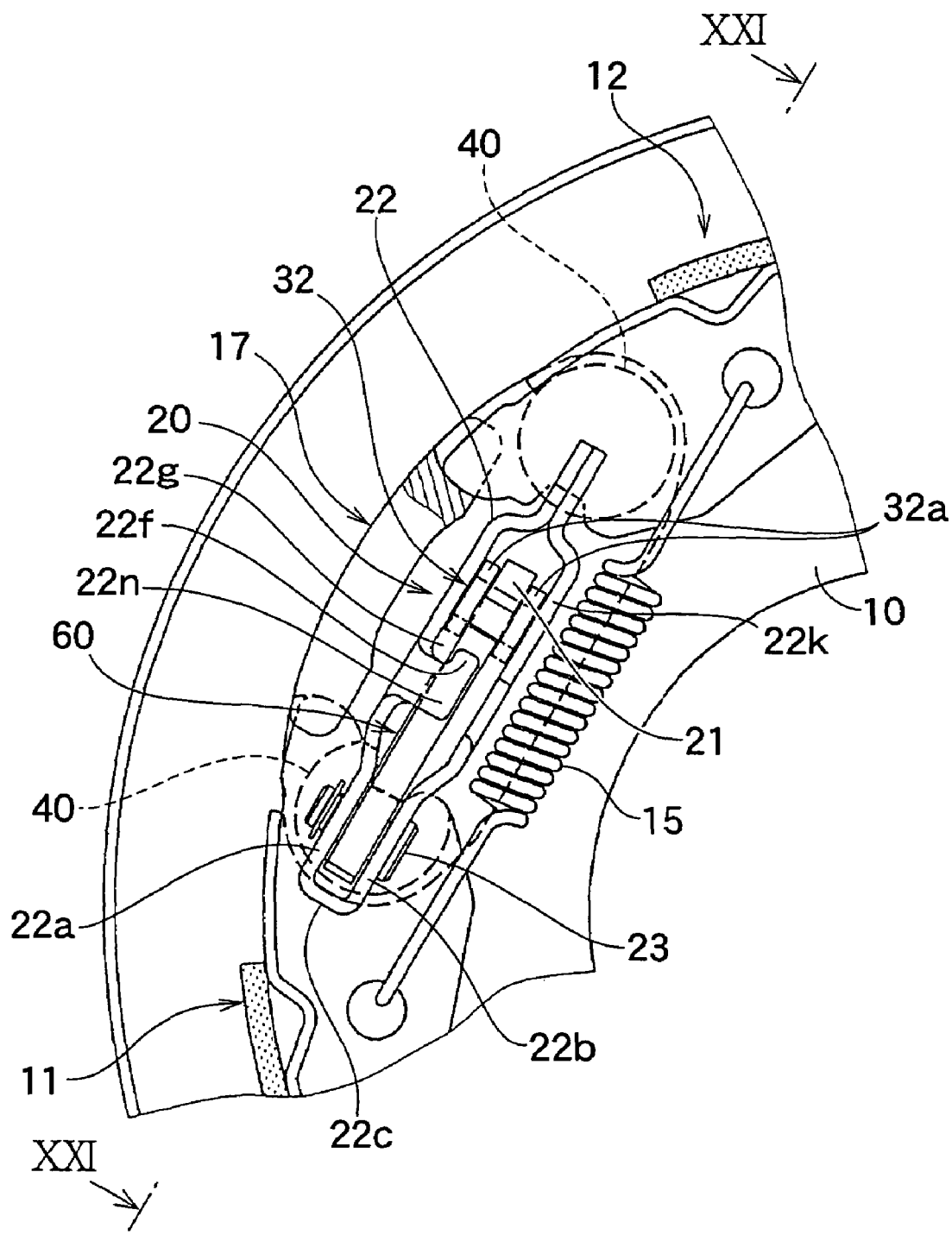
FIG. 20 is a plan view showing an example of the brake cable connecting apparatus of a fourth embodiment.

As shown in FIG. 19, the lever return spring 50 is a torsion coil spring comprising a pair of arms 51, 52 that are formed into a V shape and where the pair of arms 51, 52 converge they are bent into a loop shape to form a coil portion 53, and the free ends of each arm 51, 52 are bent at a right angle, forming hooking portions 54, 55, each having a different length.

Figure 17:
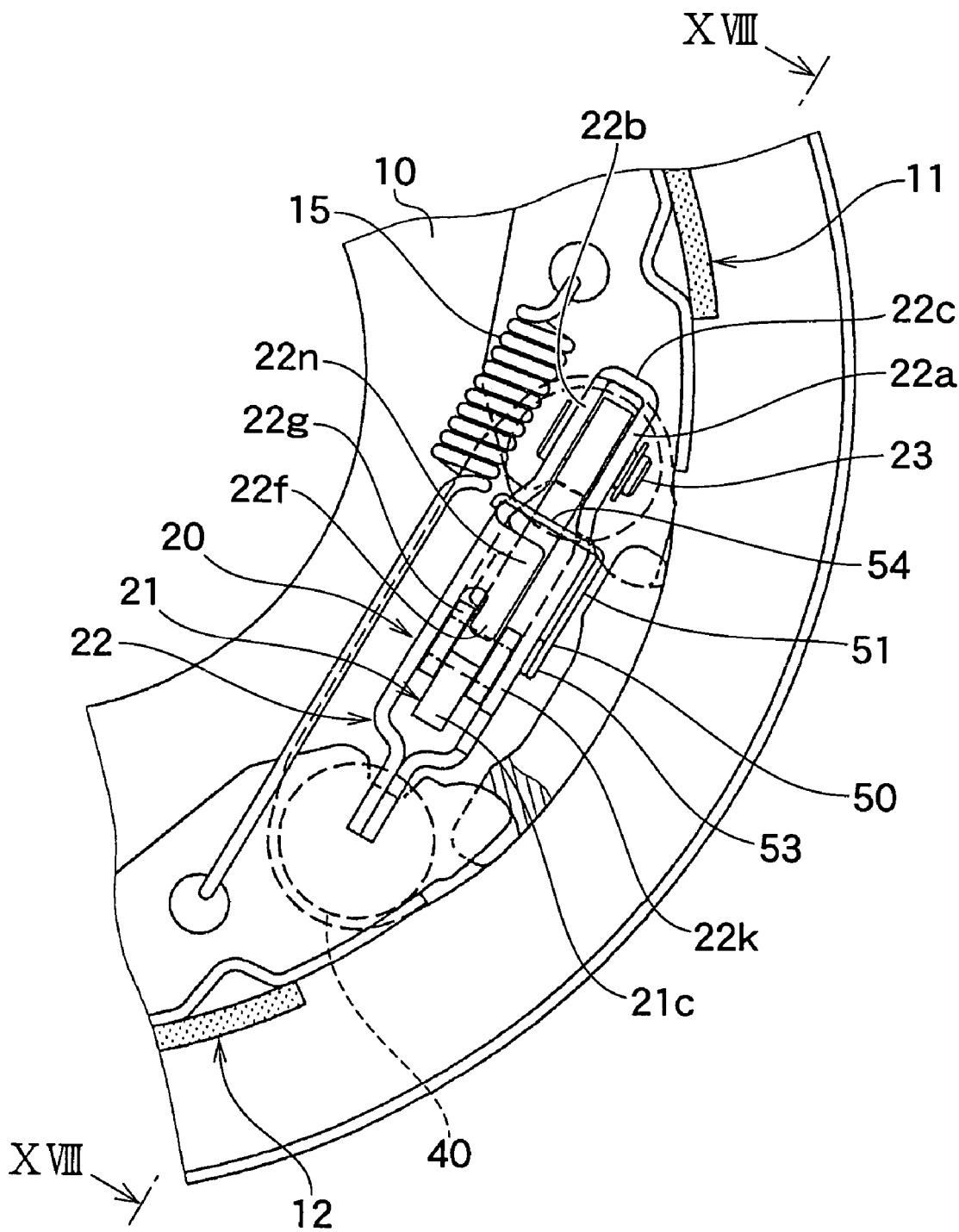
FIG. 17 is a plan view showing an example of the brake cable connecting apparatus of a third embodiment.
Figure 18:
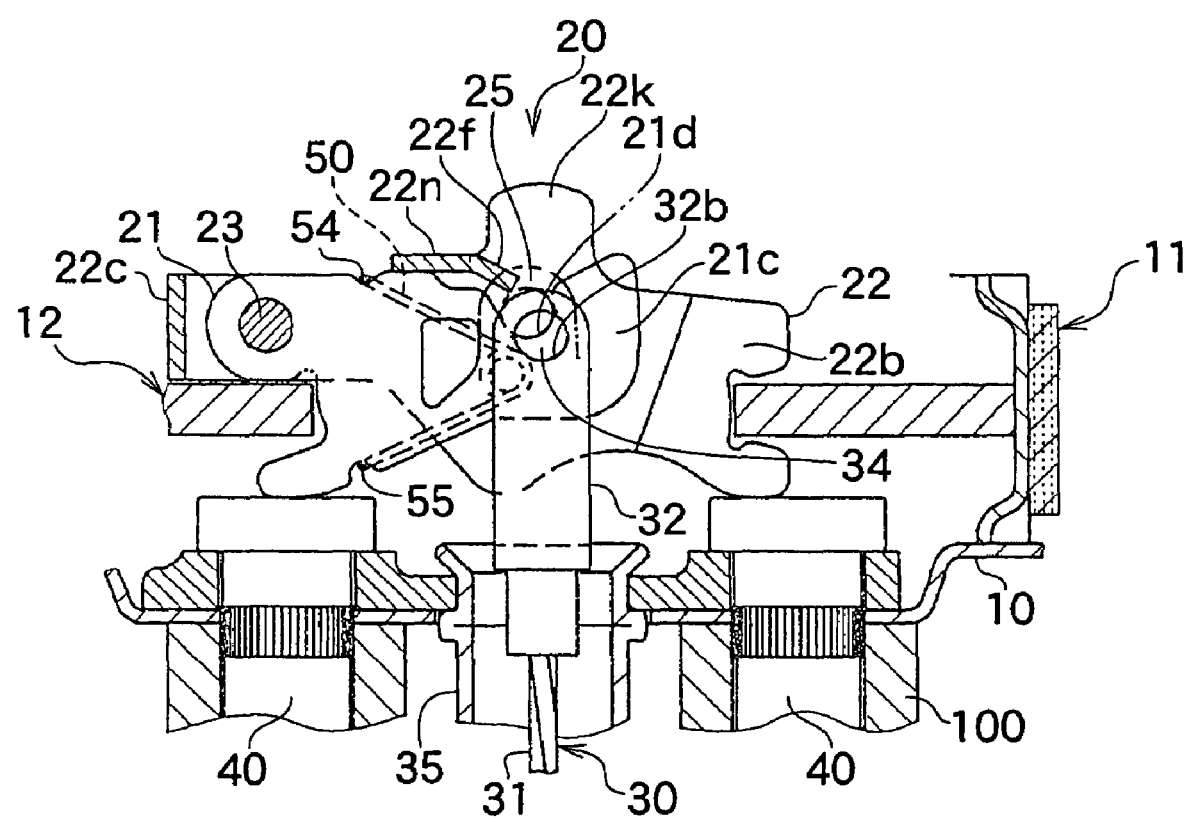
FIG. 18 is a cross-section view taken along the line XVIII-XVIII of FIG. 17.

To explain the process of placing the lever return spring 50, as shown in FIGS. 17-18, the coil portion 53 is placed on one side of the strut 22; the pair of arms 51, 52 extending from the coil portion 53 are placed towards the pivot portion of the strut 22 and the brake lever 21; and a long hook 54 and a short hook 53, which are bent at the ends of the arms 51, 52, are seated on a pair of the two facing surface walls 22a, 22b of the strut 22 and the brake lever 21 respectively, which brings return force to the brake lever 21 in the cable releasing direction by the return force of the lever return spring 50.

As in the case of the above-explained first and second embodiments, this embodiment shows that the regulating projection 22k functions to prevent the above-explained over-insertion of the connecting pin 34. Also, the gap 25 formed between the projection 22f of the strut 22 and the free end 21c of the brake lever 21 is kept smaller than the diameter of the connecting pin 34, which can prevent inadvertent disengagement of the clevis 32 from the free end 21c of the brake lever 21.

In the embodiment, after the pulling of the inner cable 31 is released, return force which restores the initial condition while the brake lever 21 rotates in the cable releasing direction is obtained from the lever return spring 50 instead of the shoe return spring of the first and second embodiments. Therefore, if there is not much room for operation stroke of the brake lever 21, or if it is difficult to realize the composition shown in the first and second embodiments, a simple reconfiguration of adding the lever return spring 50, the similar benefit as that of the first and second embodiments can be obtained.

Embodiment 4

The brake cable connecting apparatus of the fourth embodiment of the invention will be explained with reference to FIGS. 20-23. The embodiment employs an independent component, a stopper spring 60 shown in FIG. 23, as a means to prevent disengagement of the clevis 32 connected to the free end 21*c* of the brake lever 21 from the brake lever 21.

<A> Stopper Spring

Figure 22:
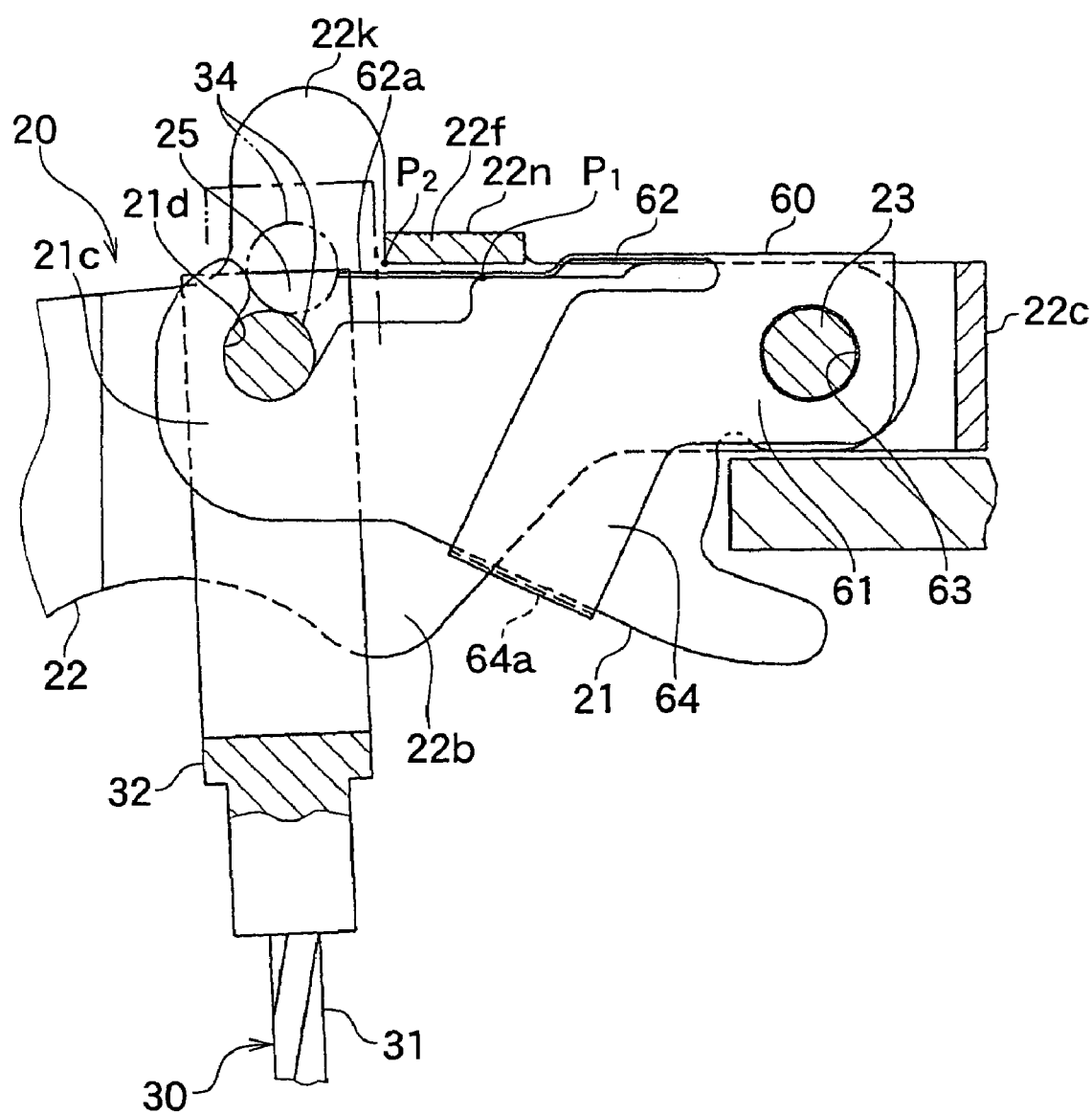
FIG. 22 is a view explaining operation of the brake cable connecting apparatus of the fourth embodiment and an enlarged view explaining the process where the clevis is connected to the brake lever.
Figure 23:
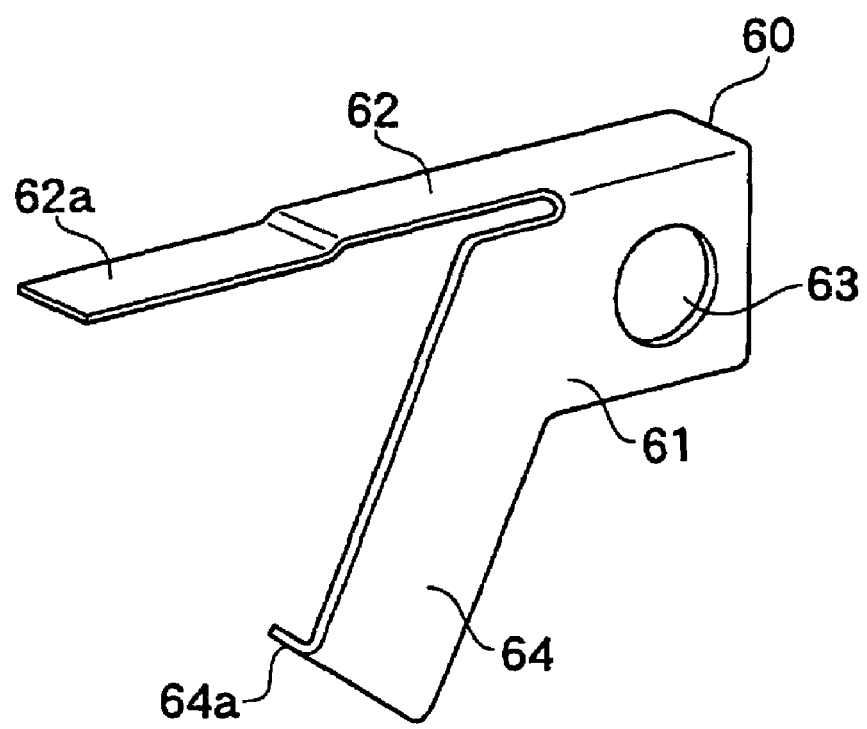
FIG. 23 is an isometric view of the stopper spring of the brake cable connecting apparatus of the fourth embodiment.
Figure 24:
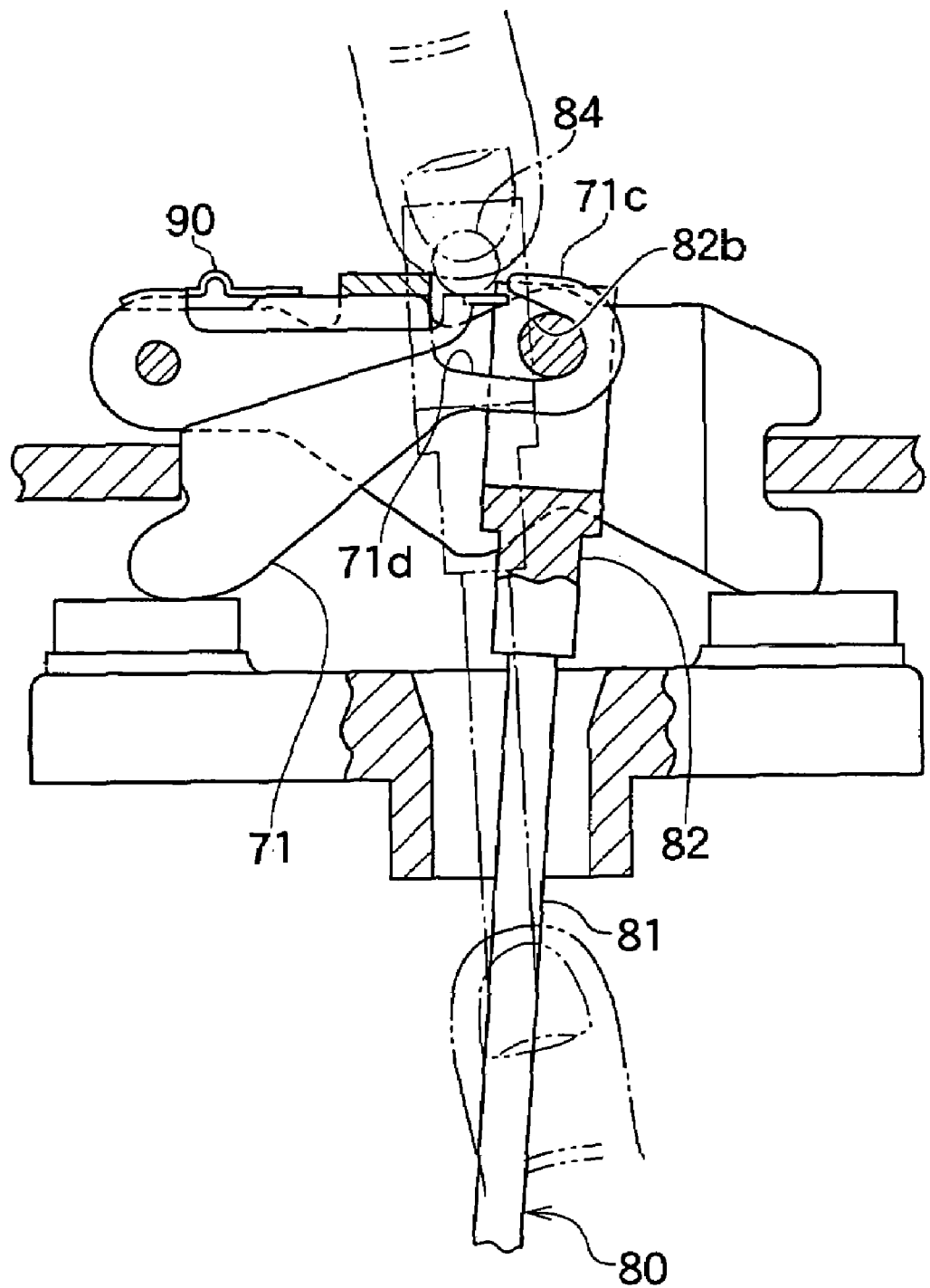
FIG. 24 is a view explaining operation of the conventional brake cable connecting apparatus and explaining a condition where the engagement holes of the clevis are exposed from the strut, the connecting pin is inserted into the engagement holes of the clevis and retained by fingertips, and the connecting pin is retained within the cable connecting groove by pulling the inner cable while preventing disengagement of the connecting pin.

As shown in FIG. 23, the stopper spring 60 comprises a proximal end 61 which is bent into an L-shaped cross-section, an elongated long arm 62 extending from the proximal end 61, and an anti-rotation portion 64 (which will be described later) and the proximal end 61 provided between either one of the two facing surface walls 22*a*, 22*b* of the strut 22 and the brake lever 21 has an engagement hole 63 to be pivotally attached via the pivot pin 23. The long arm 62 provided between the tongue 22*n* of the strut 22 and the brake lever 21 has an end 62*a*, which partly protrudes above the brake connecting groove 21*d* of the brake lever 21 as shown in FIGS. 21-22.

In the embodiment, the object members which prevent the connecting pin 34 from falling out are different from those of the aforementioned first to third embodiments, comprising the end 62*a* of the stopper spring 60 which partly protrudes above the cable connecting groove 21*d* of the brake lever 21 and the free end 21*c* of the brake lever 21. As stated in the case of the afore mentioned first to third embodiments, the gap 25 between the end 62*a* of the stopper spring 60 and the free end 21*c* of the brake lever 21 is formed smaller than the diameter of the connecting pin 34.

A characteristic of the aforementioned stopper spring 60 is that together with the tongue 22*n* of the strut 22, the spring constant of the long arm 62 increases and decreases by changing the starting point where the long arm 62 is deformed in accordance with the direction of rotating of the stopper spring 60, and the spring constant of the long arm 62 increases overwhelmingly to the spring constant of the long arm 62 in connecting the clevis 32 with the connecting pin 34 to the brake lever 21 when the clevis 32 having the connecting pin 34 is disengaged from the brake lever 21 after engaged with the cable connecting groove 21*d* of the brake lever 21.

Figure 21:
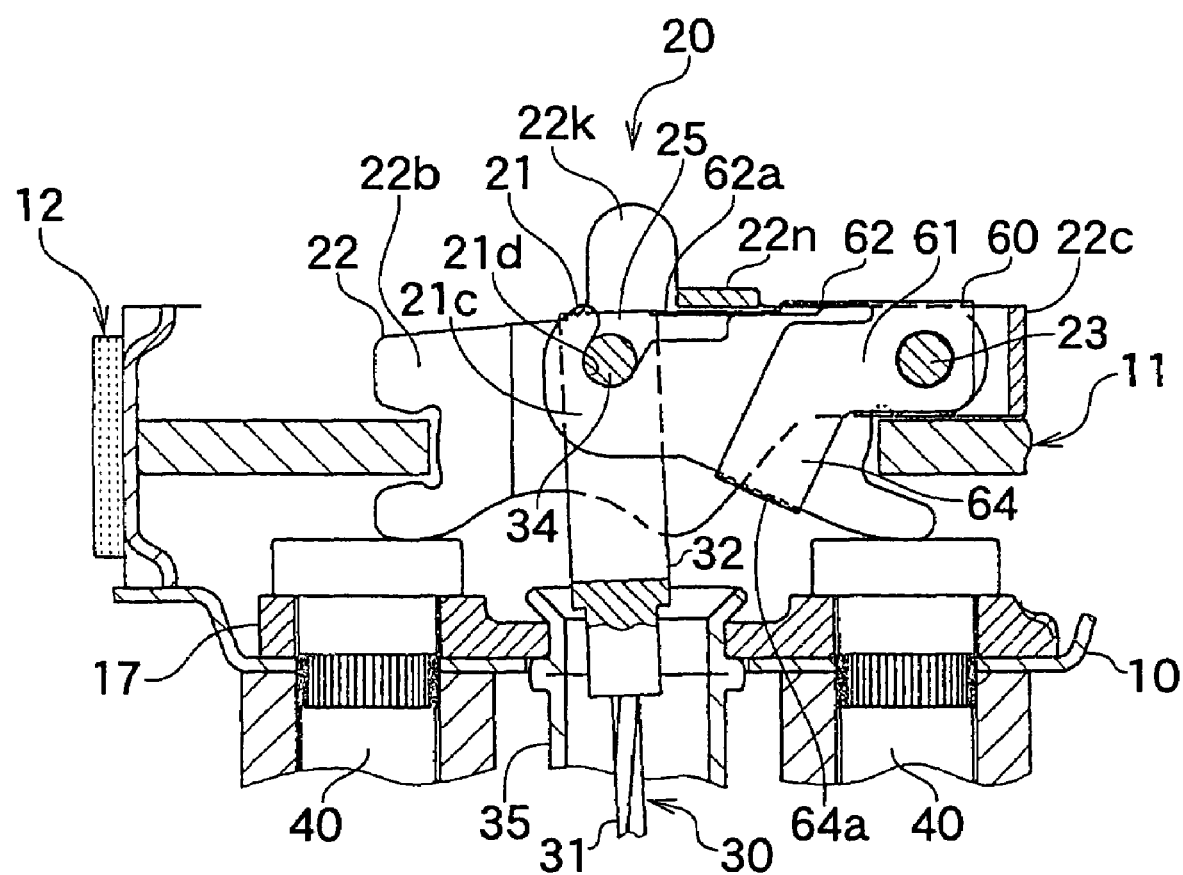
FIG. 21 is a cross-section view taken along the line XXI-XXI of FIG. 20.

An anti-rotation portion 64 is placed from the proximal end 61 towards the lower side of the brake lever 21 as shown in FIGS. 21-22. An engagement portion 64*a* which is engaged with the side of the brake lever 21, is formed by bending the end of the anti-rotation portion 64 in a through-thickness direction of the brake lever 21, and therefore a large rotation of the stopper spring 60 relative to the brake lever 21 is restricted.

<B> Operation of Stopper Spring

The operation of the stopper spring 60 placed on the brake actuating mechanism 20 will be explained below. In the aforementioned configuration of the brake actuating mechanism 20, the clevis 32 is inserted from the outside of the brake through the guide pipe 35 shown in FIG. 21 and then passed through the inside of the strut 22, and finally the connecting pin 34 is inserted into the clevis 34, utilizing the regulating projection 22*k* formed on the strut 22.

In the condition the gap 25 formed between the end 62*a* of the stopper spring 60 and the free end 21*c* of the brake lever 21 is smaller than the diameter of the connecting pin 34, which does not allow the connecting pin 34 to pass through the gap 25.

If the inner cable 31 is pulled lightly, the connecting pin 34 abuts against the end 62*a* of the stopper spring 60 and the free end 21*c*, then the long arm 62 is deformed in the cable operating direction at the tip part from the contact part P1 of the midpoint of the long arm 62 and the brake lever 21, thereby widening the gap 25.

When the gap 25 becomes larger than the diameter of the connecting pin 34, the connecting pin 34 is allowed to pass through the gap 25 and is retained in the cable connecting groove 21*d*, which completes the engagement. After the connecting pin 34 passes through the gap 25, the long arm 62 of the stopper spring 60 returns to the initial position with its own return force, and the end 62*a* is disposed projectedly in the cable connecting groove 21*d* of the brake lever 21.

In the condition, if the connecting pin 34 is disengaged from the cable connecting groove 21*d* of the brake lever 21, the long arm 62 tries to be deformed in the cable releasing direction at the tip from the contact part P2 of the halfway point of the long arm 62 and the projection 22*f* of the strut 22, but because the starting point as a spring is positioned relatively close to the end 62*a* of the long arm 62, the resilient spring constant becomes extremely large, which cannot deform the long arm 62 enough to allow passage of the connecting pin 34.

Such a configuration can prevent disengagement of the clevis 32 from the brake lever 21 during the transportation of the drum brake device.

It is readily apparent that the above-described embodiments have the advantage of wide commercial utility. It should be understood that the specific form of the invention hereinabove described is intended to be representative only, as certain modifications within the scope of these teachings will be apparent to those skilled in the art. Accordingly, reference should be made to the following claims in determining the full scope of the invention.

What is claimed is:

1. A brake cable connecting apparatus of a brake actuating mechanism for a drum brake, said brake actuating mechanism comprises:
  a strut having a first shoe engagement portion which engages with one brake shoe and two facing surface walls which extend from a portion adjacent to said first shoe engagement portion in a direction away from said one brake shoe;
  a brake lever positioned in a space between the two facing surface walls, having a pivot portion which is pivotally supported on a free end of the two facing surface walls;
  a second shoe engagement portion which engages with the other brake shoe adjacent to said pivot portion, and
  a cable connecting groove formed on a free end away from said second engagement portion thereof; and
  a brake cable which is connected to said cable connecting groove via a connecting pin;
  said brake actuating mechanism moves said brake shoes away from each other as a result of relative rotation of said strut and brake lever about said pivot portion by operation of said brake cable, and
  said drum brake comprises a resilient member;
  if two facing plates of a clevis of said brake cable are placed into a space between the two facing surface walls of the strut and the brake lever and engagement holes of said clevis are positioned to allow engagement with the connecting pin, and then if said brake cable is pulled in the cable operating direction to connect to said free end of the brake lever while the connecting pin engages with the engagement holes, then said resilient member is deformed to allow the connecting pin to move into said cable connecting groove of the brake lever, and said brake actuating mechanism comprises a cable disengagement restriction portion, said cable disengagement restriction portion prevents the disengagement of the clevis from the free end of the brake lever if said brake cable moves in a cable releasing direction, wherein a regulating projection is formed on one of two facing walls of the strut at a cable releasing side and is positioned perpendicularly adjacent to the cable disengagement restriction portion, and said regulating projection regulates a depth of the insertion of the connecting pin when the connecting pin is inserted into the engagement holes of the clevis in an axial direction of the connecting pin for the operation of connecting the brake cable to the brake lever.

2. The brake cable connecting apparatus according to claim 1, wherein said regulating projection is formed at the side to which the connecting pin moves by its own weight.

3. The brake cable connecting apparatus according to claim 1, wherein a stopper restricting an insertion position of said two facing plates of the clevis is provided on said regulating projection of the strut.

4. The brake cable connecting apparatus according to claim 2, wherein a stopper restricting an insertion position of said two facing plates of the clevis is provided on said regulating projection of the strut.

5. The brake cable connecting apparatus according to claim 1, wherein the strut has a bridge to connect the two facing surface walls with each other and said cable disengagement restriction portion consists of said bridge and said free end of the brake lever.

6. The brake cable connecting apparatus according to claim 2, wherein the strut has a bridge to connect the two facing surface walls with each other and said cable disengagement restriction portion consists of said bridge and said free end of the brake lever.

7. The brake cable connecting apparatus according to claim 3, wherein the strut has a bridge to connect the two facing surface walls with each other and said cable disengagement restriction portion consists of said bridge and said free end of the brake lever.

8. The brake cable connecting apparatus according to claim 4, wherein the strut has a bridge to connect the two facing surface walls with each other and said cable disengagement restriction portion consists of said bridge and said free end of the brake lever.

9. The brake cable connecting apparatus according to claim 1, wherein said resilient member is a shoe return spring.

10. The brake cable connecting apparatus according to claim 2, wherein said resilient member is a shoe return spring.

11. The brake cable connecting apparatus according to claim 3, wherein said resilient member is a shoe return spring.

12. The brake cable connecting apparatus according to claim 4, wherein said resilient member is a shoe return spring.

13. The brake cable connecting apparatus according to claim 5, wherein said resilient member is a shoe return spring.

14. The brake cable connecting apparatus according to claim 6, wherein said resilient member is a shoe return spring.

15. The brake cable connecting apparatus according to claim 7, wherein said resilient member is a shoe return spring.

16. The brake cable connecting apparatus according to claim 8, wherein said resilient member is a shoe return spring.

17. The brake cable connecting apparatus according to claim 1, wherein said resilient member is a lever return spring extended between the strut and the brake lever.

18. The brake cable connecting apparatus according to claim 2, wherein said resilient member is a lever return spring extended between the strut and the brake lever.

* * * * *